(12) United States Patent
Yuhara et al.

(10) Patent No.: US 6,382,448 B1
(45) Date of Patent: May 7, 2002

(54) HOUSING CASE AND A METHOD OF MAKING THEREOF

(75) Inventors: Yukitomo Yuhara, Abiko; Takehisa Hibi, Kodaira; Tatsuo Ishikawa, Sakura; Ichiro Kizawa, Tokyo, all of (JP)

(73) Assignee: Yoshida Kogyo Co., Ltd., Tokyo (JP)

( * ) Notice: Subject to any disclaimer, the term of this patent is extended or adjusted under 35 U.S.C. 154(b) by 19 days.

(21) Appl. No.: 09/599,834

(22) Filed: Jun. 23, 2000

(30) Foreign Application Priority Data

Jun. 25, 1999 (JP) .......................................... 11-179961
Jul. 16, 1999 (JP) .......................................... 11-202879

(51) Int. Cl.$^7$ ............................. B65D 25/14; B65D 6/00
(52) U.S. Cl. ................. 220/4.02; 220/62.14; 220/62.22
(58) Field of Search ........................ 220/4.07, 62.14, 220/62.15, 62.22; 206/769

(56) References Cited

U.S. PATENT DOCUMENTS

| | | | | |
|---|---|---|---|---|
| 3,231,128 A | * | 1/1966 | Klein ....................... | 220/62.14 |
| 3,776,413 A | * | 12/1973 | Myers ...................... | 220/62.14 |
| 4,457,103 A | * | 7/1984 | Aloziem ................... | 220/62.14 |
| 5,093,671 A | * | 3/1992 | Morotomi et al. ....... | 220/62.14 |
| 5,515,595 A | * | 5/1996 | Kurz .......................... | 220/4.02 |
| 5,621,311 A | * | 4/1997 | Kamiya ..................... | 220/4.02 |
| 5,660,297 A | * | 8/1997 | Liu ............................ | 220/4.02 |
| 6,070,754 A | * | 6/2000 | Newby, Sr. ............... | 220/62.14 |
| 6,114,625 A | * | 9/2000 | Hughes et al. ............ | 220/4.02 |

* cited by examiner

*Primary Examiner*—Joseph M. Moy

(57) ABSTRACT

A housing case for apparatus, which has both a display window and opaque ornamental layer on the surface of housing case, includes a transparent synthetic resin sheet. The synthetic resin sheet is provided with opaque printing layer in a pattern having unprinted portion corresponding to the display window. The synthetic resin sheet is formed into a shape of housing case. A formed product of transparent synthetic resin is insert-formed on the backside of the formed synthetic resin sheet. In the housing case, the forming of a ornamental pattern on the surface of housing case and a dispaly window can be made at the same time when forming a body of housing case(FIG. 1).

12 Claims, 32 Drawing Sheets

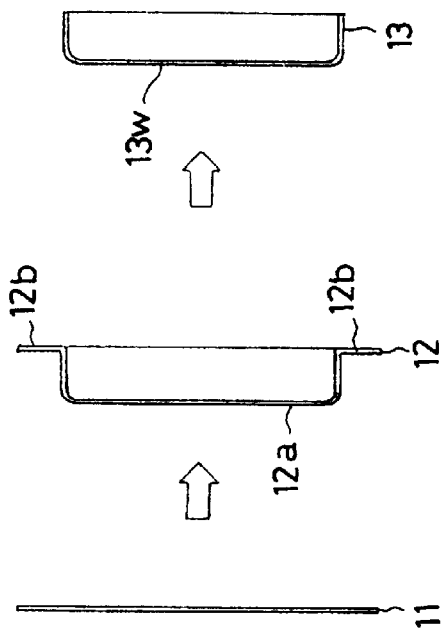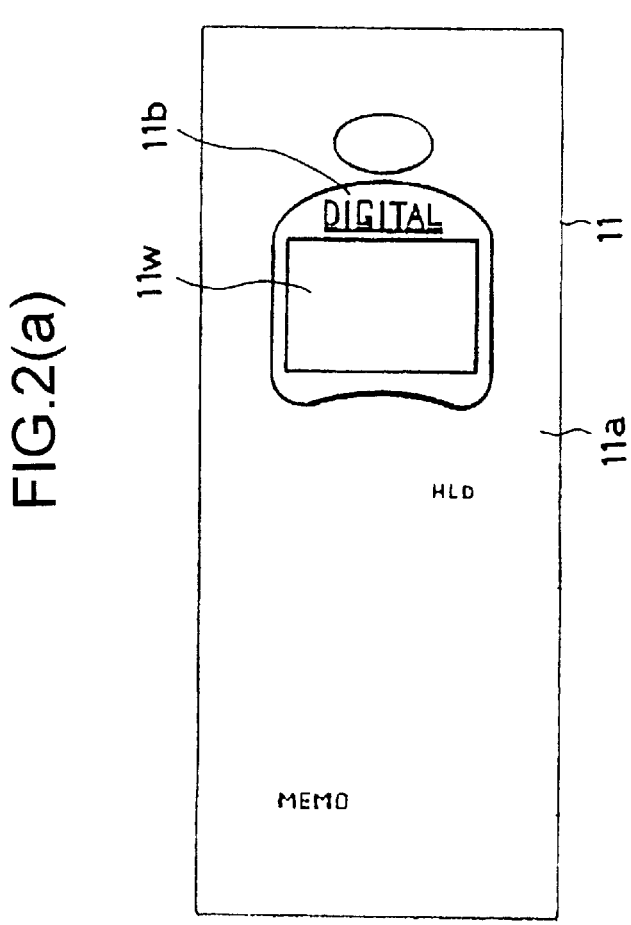

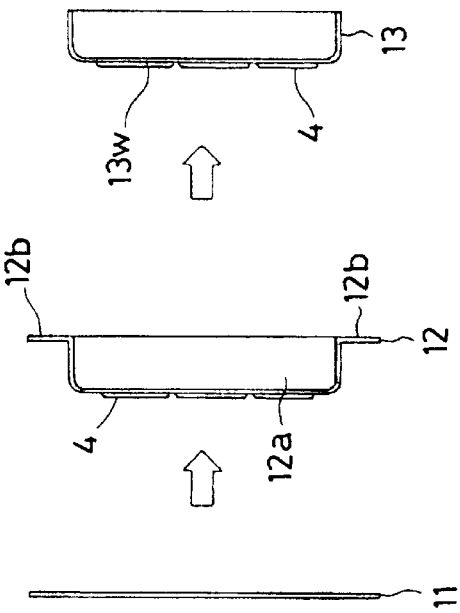
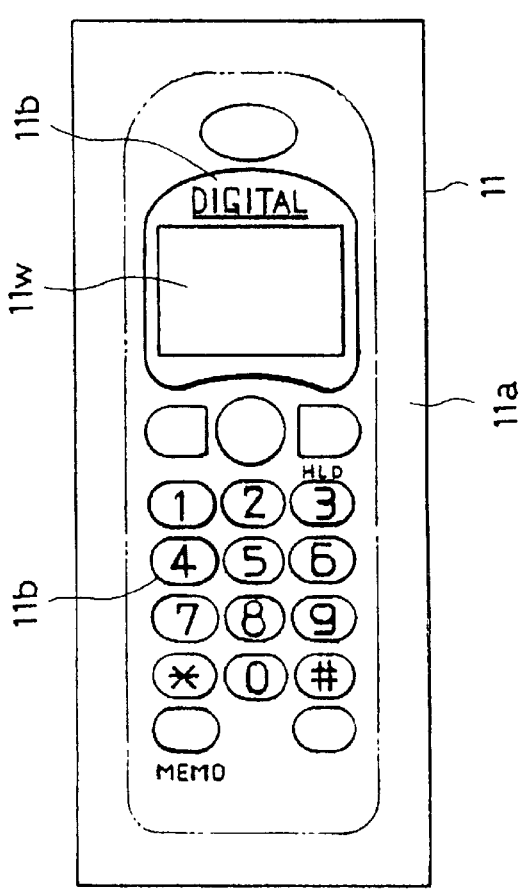
FIG.10(a) FIG.10(b) FIG.10(c)

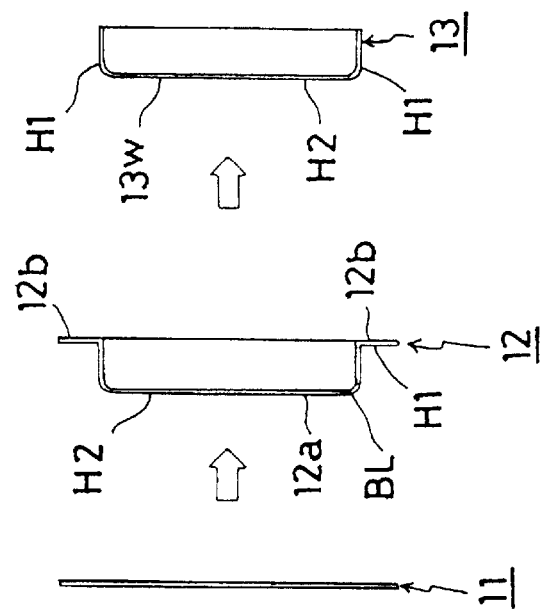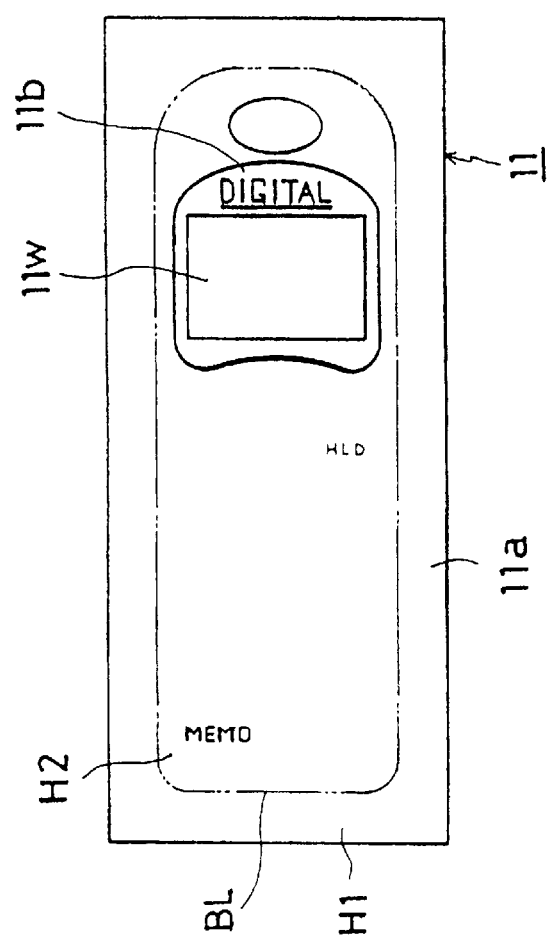

HOUSING CASE AND A METHOD OF MAKING THEREOF

BACKGROUND OF THE INVENTION

1. Field of the Invention

The present invention relates to a housing case for apparatus such as communication apparatus and electric apparatus having an opaque ornamental layer on the surface of housing case and a method of making thereof.

2. Description of the Prior Art

In recent years, with the spread of portable telephone, a housing case forming the exterior view of portable telephone has been provided with varied indications of functions together with the diversification of function, and with varied ornamental patterns for distinguishing products manufactured by individual companies from products manufactured by other companies.

As methods of decorating housing cases with ornamental pattern, there are a method in which ornamental pattern is printed on the flat surface of three-dimensionally formed housing case by hot stamping, a method in which a housing case is insert-formed with a plate having a preprinted ornamental pattern and a method in which air spray coating is made on three-dimensionally formed housing case.

In each of the above-mentioned methods for decorating housing cases with ornamental pattern, it is needed to provide a housing case with a transparent display window for seeing liquid crystal display device mounted within the housing case. Therefore, in order to provide a housing case with the display window, a transparent plastic cover with a window hole made separately from a body of housing case is put in the body of housing case.

However, in the above-mentioned method of making of housing case, there is a problem that since the process of putting a transparent plastic cover with a window hole made separately from a body of housing case in the body of housing case is needed, much labor is required for making a housing case by labor needed for the process of putting a transparent plastic cover with a window hole made separately from a body of housing case in the body of housing case, and so the production cost of housing case is as high as ever.

It is thought that after a housing case is formed of transparent synthetic resin, and a part of the housing case corresponding to a display window is masked, opaque ornamental coating is made on the surface of housing case except an area corresponding to the display window by air spray coating. However, this method is not a practical method considering the masking of an area corresponding to the display window.

Further, a housing case is provided with push-buttons for dialing and various functions, which are made as parts separate from a body of housing case and set in button holes formed in the body of housing case.

However, in this case, there is a problem that since a process of putting push-buttons in a body of housing case is needed, much labor is required for making a housing case by labor needed for the process of putting push-buttons in a body of housing case, and so the production cost of housing case is as high as ever.

Further, there is a case where small-sized electric apparatus and communication apparatus, for example portable telephone carried in a pocket or a bag is failed, and strike another articles in a pocket by accident, so that printing layer on the housing case peels off and a cut is made on the surface of housing case.

For this reason, it is needed to apply hard coating layer having higher hardness than resin forming a body of housing case on the surface of housing case. The work of applying the hard coating layer on the surface of housing case is generally made by a method which comprises forming the hard coating layer on a formed housing case by air spray coating.

However, the above-mentioned process of applying the hard coating layer on the surface of housing case is a process independent from the forming of housing case. Further, after the hard coating layer on the surface of housing case, it is needed to dry the hard coating layer, and so the process of applying the hard coating layer on the surface of housing case is generally troublesome and requires much time.

Further, as another method for forming the hard coating layer on a formed housing case, there is a method by insert-forming, in which a high-hardness sheet forming the hard coating layer is put in a mold and resin is injected into the mold, by which a housing case can be formed with the hard coating layer on the surface of housing case. However, since high-hardness sheet is inferior in the workability. When deep-drawing of the high-hardness sheet is made so as to largely deform the high-hardness sheet, there is a case where fine cracks are generated and wrinkles are formed in edge portions in which the high-hardness sheet is largely deformed, so that the beauty of housing case is injured.

As further another method for forming the hard coating layer on the surface of housing case, what is called an in-mold-printing method is thought in which a hard coating layer film comprised of a continuous film, printing layer made on the continuous film and hard coating layer applied on the continuous film having the printing layer is put in a mold, synthetic resin is injected, by which decorated formed product is continuously manufactured. However, in order to make the deep-drawing of high-hardness sheet, the hardness of hard coating layer is restricted so that the required hardness of the front of housing case can be obtained.

BRIEF SUMMARY OF INVENTION

Accordingly, it is a first object of the present invention to provide a housing case in which the work of decorating the surface of housing case and the work of forming a display window can be made at the same time when forming a body of housing case by a method of insert-forming so that a housing case can be made at high efficiency of production.

It is a second object of the present invention to a method of making of housing case in which the work of decorating the surface of housing case and the work of forming a display window can be made at the same time when forming a body of housing case by a method of insert-forming so that a housing case can be made at high efficiency of production.

It is a third object of the present invention to provide a housing case in which the work of decorating the surface of housing case, the work of forming a display window and the work of forming push buttons can be made at the same time when forming a body of housing case by a method of insert-forming so that a housing case can be made at high efficiency of production.

It is a fourth object of the present invention to provide a method of making of housing case in which the work of decorating the surface of housing case, the work of forming a display window and the work of forming push buttons can be made at the same time when forming a body of housing case by a method of insert-forming so that a housing case can be made at high efficiency of production.

It is a fifth object of the present invention to provide a housing case in which hard coating layer is preformed on synthetic resin sheet used in insert-forming, by which a housing case covered with hard coating layer can be formed by a simpler production process, wherein influence exerted on hard coating layer when deep-drawing is made to synthetic resin sheet is particularly lessened, and a housing case having sharp edges and good quality of forming can be obtained.

It is a sixth object of the present invention to provide a method of making of a housing case in which hard coating layer is preformed on synthetic resin sheet used in insert-forming, by which a housing case covered with hard coating layer can be formed by a simpler production process, wherein influence exerted on hard coating layer when deep-drawing is made to synthetic resin sheet is particularly lessened, and a housing case having sharp edges and good quality of forming can be obtained.

It is a seventh object of the present invention to provide a housing case in which a body of housing case and a display window can be formed at the same time and continuously, wherein forming of body of housing case into three-dimensional shape can be easily made and enough strength can be given to the front of housing case.

It is an eighth object of the present invention to provide a method of making of housing case in which a body of housing case and a display window can be formed at the same time and continuously, wherein forming of body of housing case into three-dimensional shape can be easily made and enough strength can be given to the front of housing case.

The first object of the present invention can be attained by a housing case for apparatus having both a display window and opaque ornamental layer on the surface of housing case, characterized in that the housing case comprises a transparent synthetic resin sheet, said synthetic resin sheet is provided with opaque printing layer in a pattern having unprinted portion corresponding to the display window, the synthetic resin sheet is formed into a shape of housing case, and that a formed product of transparent synthetic resin forming a body of housing case together with the formed synthetic resin sheet is provided on the backside of the formed synthetic resin sheet(a first invention of the present application).

Further, the first object of the present invention can be obtained by a housing case for apparatus having both a display window and opaque ornamental layer on the surface of housing case, characterized in that the housing case comprises a synthetic resin sheet, said synthetic resin sheet is provided with opaque printing layer and with a window hole made in an area corresponding to a display window of housing case, the synthetic resin sheet is formed into a shape of housing case, and that a formed product of transparent synthetic resin forming a body of housing case together with the formed synthetic resin sheet and a transparent window part formed integrally with the formed product of transparent synthetic resin and filling the window hole are provided on the backside of the formed synthetic resin sheet.

The second object of the present invention can be attained by a method of making of housing case for apparatus having both a display window and opaque ornamental layer on the surface of housing case, characterized in that the method comprises the steps of: applying opaque printing layer in a pattern having unprinted portion corresponding to the display window on a synthetic resin sheet; deep-drawing the synthetic resin sheet into a shape of housing case; putting this formed synthetic resin sheet in a mold; and injecting molten transparent synthetic resin into the mold, by which a formed product of transparent synthetic resin forming a body of housing case together with the formed synthetic resin sheet is formed.

Further, the second object of the present invention can be obtained by a method of making of housing case for apparatus having both a display window and opaque ornamental layer on the surface of housing case, characterized in that the method comprises the steps of: applying printing layer on a synthetic resin sheet; deep-drawing the synthetic resin sheet into a shape of housing case; making a window hole in an area corresponding to the display window of the synthetic resin sheet; putting the deep-drawn and holed synthetic resin sheet in a mold; and injecting molten transparent synthetic resin into the mold, by which a formed product of transparent synthetic resin forming a body of housing case together with the formed synthetic resin sheet and transparent window part formed integrally with the formed product of transparent synthetic resin and filling the window hole are formed.

The third object of the present invention can be attained by a housing case for apparatus having both a display window and opaque ornamental layer on the surface of housing case, characterized in that the housing case comprises a transparent synthetic resin sheet, said synthetic resin sheet is provided with push-button areas and with opaque printing layer in a pattern having unprinted portion corresponding to the display window, the synthetic resin sheet is formed into a shape of housing case, and that a formed product of transparent synthetic resin forming a body of housing case together with the formed synthetic resin sheet and movable button pieces formed integrally with the formed product of transparent synthetic resin are provided on the backside of the formed synthetic resin sheet(a second invention of the present application).

In the housing case according to the second invention, slits may be formed along contours of the push-button areas.

The fourth object of the present invention can be attained by a method of making of housing case for apparatus having both a display window and opaque ornamental layer on the surface of housing case, characterized in that the method comprises the steps of: providing the transparent synthetic resin sheet with push-button areas and applying opaque printing layer in a pattern having unprinted portion corresponding to the display window on a synthetic resin sheet; deep-drawing the synthetic resin sheet into a shape of housing case; thereafter putting the formed synthetic resin sheet in a mold; and injecting molten transparent synthetic resin into the mold, by which a formed product of transparent synthetic resin forming a body of housing case together with the formed synthetic resin sheet is formed at the same time movable button pieces formed integrally with the formed product of transparent synthetic resin pieces are formed on the backside of the push button areas.

In the method of making of housing case according to the above-mentioned invention, slits may be formed along contours of the push-button areas.

The fifth object of the present invention can be attained by a housing case for apparatus having both a display window and opaque ornamental layer on the surface of housing case, characterized in that the housing case comprises a transparent synthetic resin sheet, said synthetic resin sheet is provided with opaque printing layer in a pattern having unprinted portion corresponding to the display window, hard coating layer is applied on the surface of synthetic resin sheet with the opaque printing layer, wherein the hard coating layer is formed in such a manner that a part of the hard coating layer corresponding to the edge portions of housing case has low hardness and a part of the hard coating layer corresponding to the front of housing case has high hardness, the synthetic resin sheet is formed into a shape of housing case, and that a formed product of transparent synthetic resin forming a body of housing case together with the formed synthetic resin sheet is provided on the backside of the formed synthetic resin sheet(a third invention of the present application).

In the housing case according to the third invention, as the hard coating layer, such a hard coating layer that a part corresponding to the edge portions of housing case is made of a low-hardness coating layer and a part corresponding to the front of housing case is made of a laminate of a low-hardness hard coating layer and a high-hardness hard coating layer can be applied, or such a hard coating layer that a part corresponding to the edge portions of housing case are made of a thin laminate and a part corresponding to the front of housing case is made of a thick laminate can be applied.

The sixth object of the present invention can be attained by a method of making of housing case for apparatus having both a display window and opaque ornamental layer on the surface of housing case, characterized in that the method comprises the steps of: applying opaque printing layer in a pattern having unprinted portion corresponding to the display window on a synthetic resin sheet and applying a hard coating layer on the surface of synthetic resin sheet with the opaque printing layer, wherein the hard coating layer is formed in such a manner that a part of the hard coating layer corresponding to the edge portions of housing case has low hardness and a part of the hard coating layer corresponding to the front of housing case has high hardness; deep-drawing the synthetic resin sheet with opaque printing layer and the hard coating layer into a shape of housing case; thereafter putting the formed synthetic resin sheet in a mold; and injecting molten transparent synthetic resin into the mold, by which a formed product of transparent synthetic resin forming a body of housing case together with the formed synthetic resin sheet is formed.

In the method of making of housing case according to the above-mentioned invention, as the hard coating layer, such a hard coating layer that a part corresponding to the edge portions of housing case is made of a low-hardness hard coating layer and a part corresponding to the front of housing case is made of a laminate of a lower-harness coating layer and a high-hardness hard coating layer can be applied, or such a hard coating layer that a part corresponding to the edge portions of housing case are made of a thin laminate and a part corresponding to the front of housing case is made of a thick laminate can be applied.

The seventh object of the present invention can be attained by a housing case for apparatus having both a display window and opaque ornamental layer on the surface of housing case, characterized in that the housing case comprises a formed product of transparent synthetic resin forming a body of housing case, said formed product of transparent synthetic resin is provided with opaque printing layer in a pattern having unprinted portion corresponding to the display window and with hard coating layer covering the printing layer, wherein the hard coating layer is formed in such a manner that a part of the hard coating layer covering areas corresponding to the edge portions of the formed product of transparent synthetic resin has low hardness and a part of the hard coating layer covering an area corresponding to the front of the formed product of transparent synthetic resin has high hardness(a fourth invention of the present application).

In the method of making of housing case according to the above-mentioned invention, as the hard coating layer, a hard coating layer in which a part corresponding to the edge portions of housing case is made of a hard coating layer having low hardness and a part corresponding to the front of housing case is made of a laminate of a hard coating layer having low hardness and a hard coating layer having high hardness, or a hard coating layer in which a part corresponding to the edge portions of housing case are made of a thin laminate and a part corresponding to the front of housing case is made of a thick laminate can be applied.

The eighth object of the present invention can be attained by a method of making of housing case for apparatus having both a display window and opaque ornamental layer on the surface of housing case, characterized in that the method comprises the steps of: providing a continuous film including a base film, a release layer, a hard coating layer and printing layer with pattern having unprinted portion corresponding to the display window and an adhesion layer which are laid on the base sheet in order, wherein the hard coating layer is formed in such a manner that a part of the hard coating layer covering areas corresponding to the edge portions of the formed product of transparent synthetic resin has low hardness and a part of the hard coating layer covering an area corresponding to the front of the formed product of transparent synthetic resin has high hardness; putting the continuous film in a mold so as to direct the adhesion layer toward the inside of the mold, and; injecting transparent synthetic resin into the mold, by which a formed product of transparent resin is formed forming a body of housing case and while the printing layer and the hard coating layer are transferred to the surface of formed product of transparent synthetic resin.

BRIEF DESCRIPTION OF THE DRAWINGS

In the drawings:

FIG. 2 is a view illustrating the deep-drawing process of synthetic resin sheet;

FIG. 10 is a view illustrating the deep-drawing process of synthetic resin sheet;

FIG. 21 is a view-illustrating the deep-drawing process of synthetic resin sheet;

DETAILED DESCRIPTION

Figure 1:
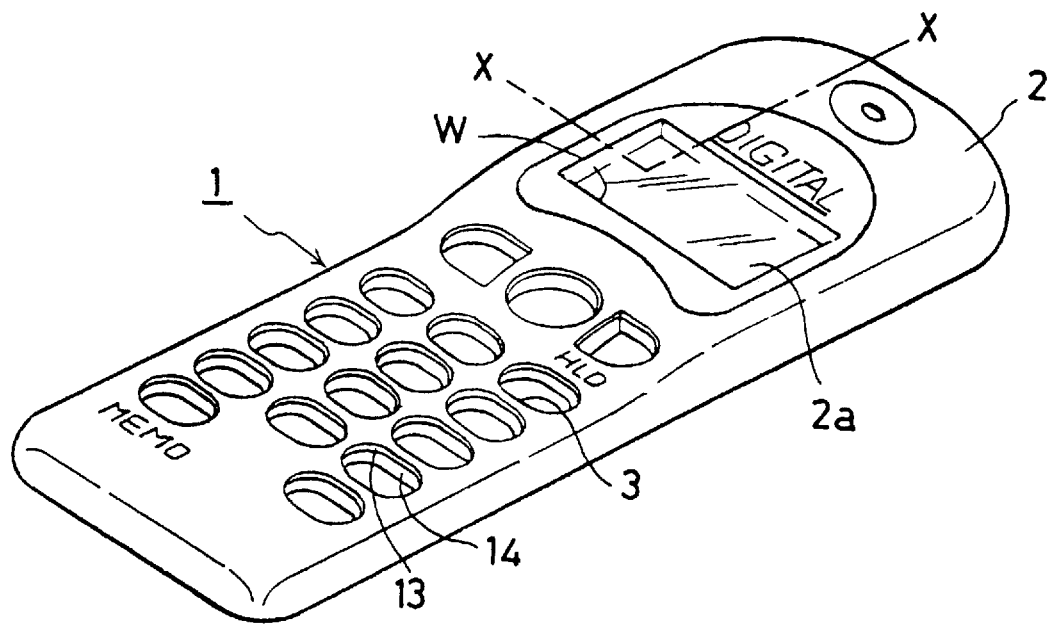
FIG. 1 is a perspective view of a housing case of a first embodiment of the present invention.
Figure 3:
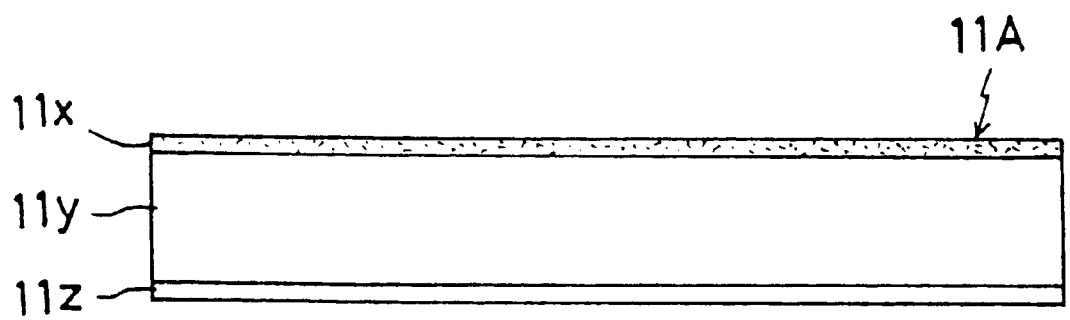
FIG. 3 is a sectional view of synthetic resin sheet used in the deep-drawing process of synthetic resin sheet.

Then, referring to FIGS. 1 to 4, a housing case of the first embodiment of the present invention and a method of making thereof is explained, FIG. 1 is a perspective view of housing case of the present embodiment. FIG. 2 is a view illustrating the deep-drawing process of synthetic resin sheet. FIG. 3 is a sectional view of synthetic resin sheet. FIG. 4 is a view illustrating the insert-forming process. FIG. 5 is a fragmentary sectional view taken on line X—X of FIG. 1 of housing case.

As shown in FIG. 1, a housing case 1 of portable telephone of the present embodiment includes a case body 2 which is comprised of a decorated synthetic resin sheet layer 13 having ornamental opaque printing layer on the surface thereof and transparent synthetic resin layer 14 provided on the backside of the case body.

The case body 2 is formed with a transparent display window W which is comprised of a window hole 2a which is made in the synthetic resin sheet 13 and a portion of the transparent synthetic resin layer 14 which can be seen through the window hole 2a and with a plurality of button holes 3 made in the case body.

This housing case 1 and a back case (not shown) are held together as a unit, inside which a substrate is held on which electric elements and memory for communication, and push-buttons inserted into the button holes 3 are arranged, by which a portable telephone is formed.

Referring to FIGS. 2 to 4, a method of making of housing case 1 is explained. Further, referring to FIGS. 2 and 3, a method of forming synthetic resin sheet is explained.

As shown in FIG. 2(a), first, synthetic resin sheet 11 is provided. A body 11a of the synthetic resin sheet 11 is provided with printing 11b, in particular with an area 11w which become display window W (see FIG. 1).

Herein, referring to FIG. 3, the structure of synthetic resin sheet is explained. FIG. 3 is a sectional view of synthetic resin sheet 11A. The synthetic resin sheet 11A is comprised of printing layer 11x which shows characters and partial patterns, base sheet 11y formed of synthetic resin such as PET, polycarbonate, acrylic resin and others and adhesion layer 11z, wherein the printing layer, the base sheet 11y and the adhesion layer 11z are laid in order from the side of surface of the synthetic resin sheet. The base sheet 11y and the adhesion layer 11z are transparent, so that an area in which printing layer 11x does not exist, of the synthetic resin sheet remains transparent.

Then, as shown in FIG. 2(b), synthetic resin 11 is deep-drawn by pressure forming in which the synthetic resin sheet 11 is heated in the given mold, and pressed by high-pressure air under the state where the synthetic resin sheet 11 is softened. In such a way, the pressure-formed synthetic resin sheet 12 becomes a three-dimensionally formed sheet 12a except a blank portion 12b.

Then, as shown in FIG. 2(c), the synthetic resin sheet 12 is trimmed removing blank portion 12b from the synthetic resin sheet 12, button holes (not shown) are made, so that three-dimensionally formed synthetic resin sheet 13 can be obtained. The surface of three-dimensionally formed synthetic resin sheet 13 is almost covered with printing layer 11x to become opaque so that only window portion 13W remains transparent.

Referring to FIG. 4, the insert-forming process using the above-mentioned three-dimensionally synthetic resin sheet 13 is explained.

Figure 4A:
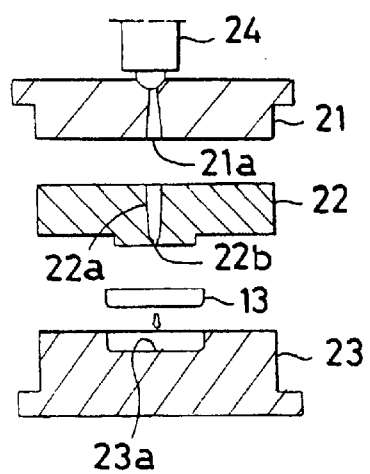
FIG. 4 is a view illustrating the insert-forming process.
Figure 5:
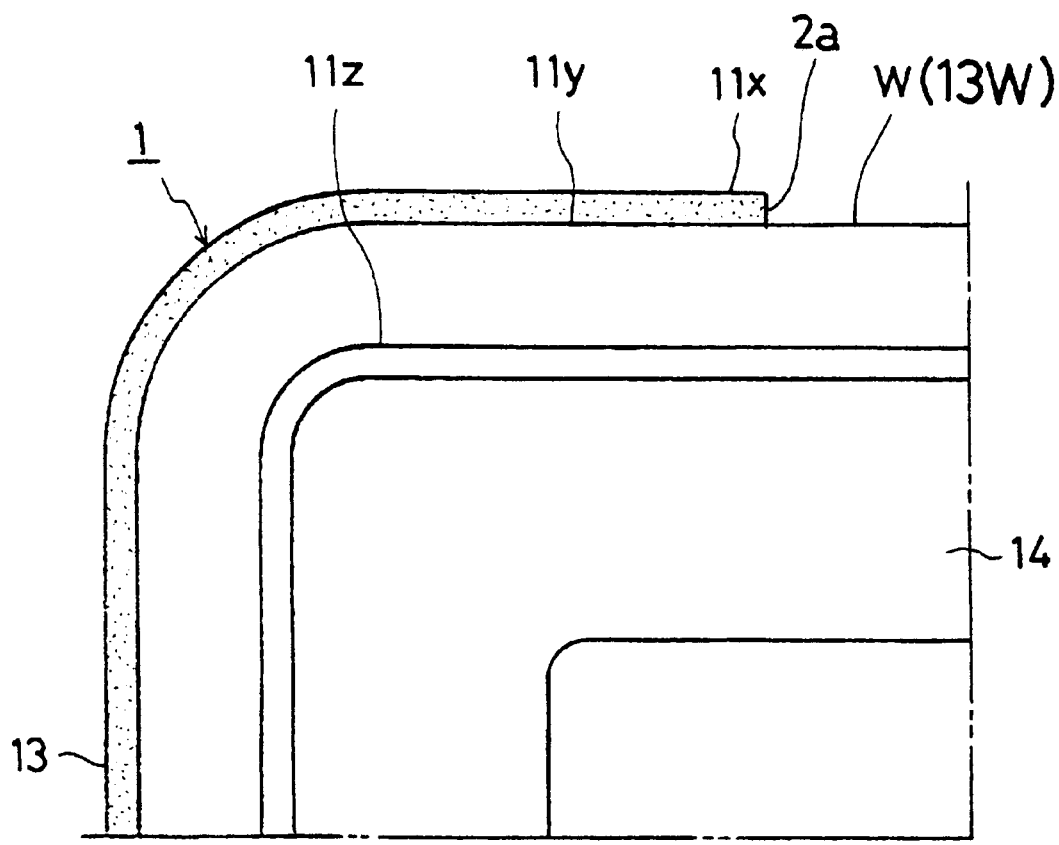
FIG. 5 is a fragmentary sectional view taken on line X—X of FIG. 1 of housing case.

As shown In FIG. 4(a), in the insert-forming process, a mold formed of a fixed side die plate 21, a core side die plate 22, a cavity side die plate 23 is used. The three-dimensionally formed synthetic resin sheet 13 through the deep-drawing process is put in a cavity 23a of cavity side die plate 23, by which the preparation of insert-forming is made.

Figure 4B:
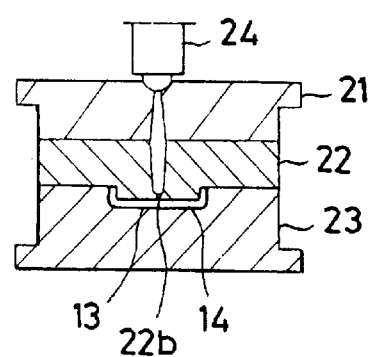

Then, as shown in FIG. 4(b), individual die plates 21, 22, 23 are assembled into a mold, and molten transparent synthetic resin is injected into the mold through conducting paths 21a, 22a of core side die plate 22 from a nozzle 24 of molding machine, wherein three-dimensionally formed synthetic resin sheet 13 is fixed to the bottom face of cavity 23a of cavity side die plate 23 in such a manner that there is not a gap between the bottom face of cavity and the three-dimensionally formed synthetic resin sheet, and molten resin is injected into a space between three-dimensionally formed synthetic resin sheet 13 and core side die plate 22, so that transparent synthetic resin sheet 14 is formed.

When injected resin cools down to harden, the adhesion layer 11z applied on the backside of three-dimensionally formed synthetic resin sheet 13 (refer to FIG. 3) is held together with injected resin in the mold so that a housing case 1 composed of three-dimensionally formed synthetic resin sheet 13 and transparent synthetic resin layer 14 is formed.

Figure 4C:
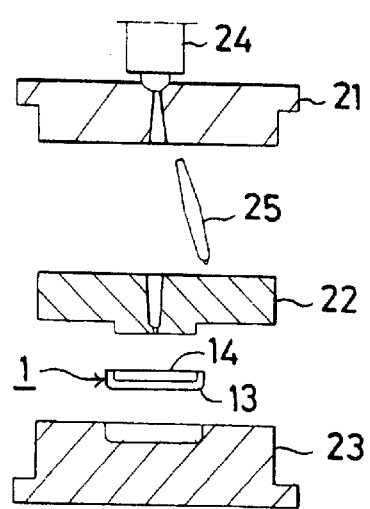

Lastly, as shown in FIG. 4(c), fixed side die plate 21, core side die plate 22, and cavity side die plate 23 are separated from each other, and sprue 25 is removed from conducting paths 21a, 22a, and a housing case 1 is taken from cavity 23a of cavity side die plate 23, by which the insert-forming process is finished.

Referring to FIG. 5, the structure of housing case manufactured through the above-mentioned deep-drawing process and the above-mentioned insert-forming process is explained FIG. 5 is a sectional view taken on line X—X of FIG. 1.

As shown in FIG. 5, housing case 1 is comprised of three-dimensionally formed synthetic resin sheet layer 13 and transparent synthetic resin layer 14 formed on the inside of housing case, wherein an area in which printing layer 11x does not exist remains as a window area 13w so that transparent base sheet 11y, adhesion layer 11z, and transparent synthetic resin layer 14 can be seen through the window area, therefore display window W being formed.

As above-mentioned, according to the present embodiment, housing case 1 is formed through the deep-drawing process and the insert-forming process. In the housing case 1, an area in which printing layer 11x does not exist, of the synthetic resin sheet layer 13 forming a part of body 2 of housing case forms a transparent window area 13W.

Then, by forming transparent synthetic resin layer 14 on the backside of synthetic sheet 13 through the insert-forming process, display window W is formed by window area 13W and transparent synthetic resin layer 14. Therefore, high efficiency of production can be attained as compared with a conventional method in which window shield is made as parts separate from a body of housing case and thereafter put in the body of housing case.

There is a case where hard coating layer is applied on the whole surface of housing case 1 including display window W in order to increase resistance to scratch, wherein hard coating layer may be previously applied on the outside of printing layer 11x.

Figure 6:
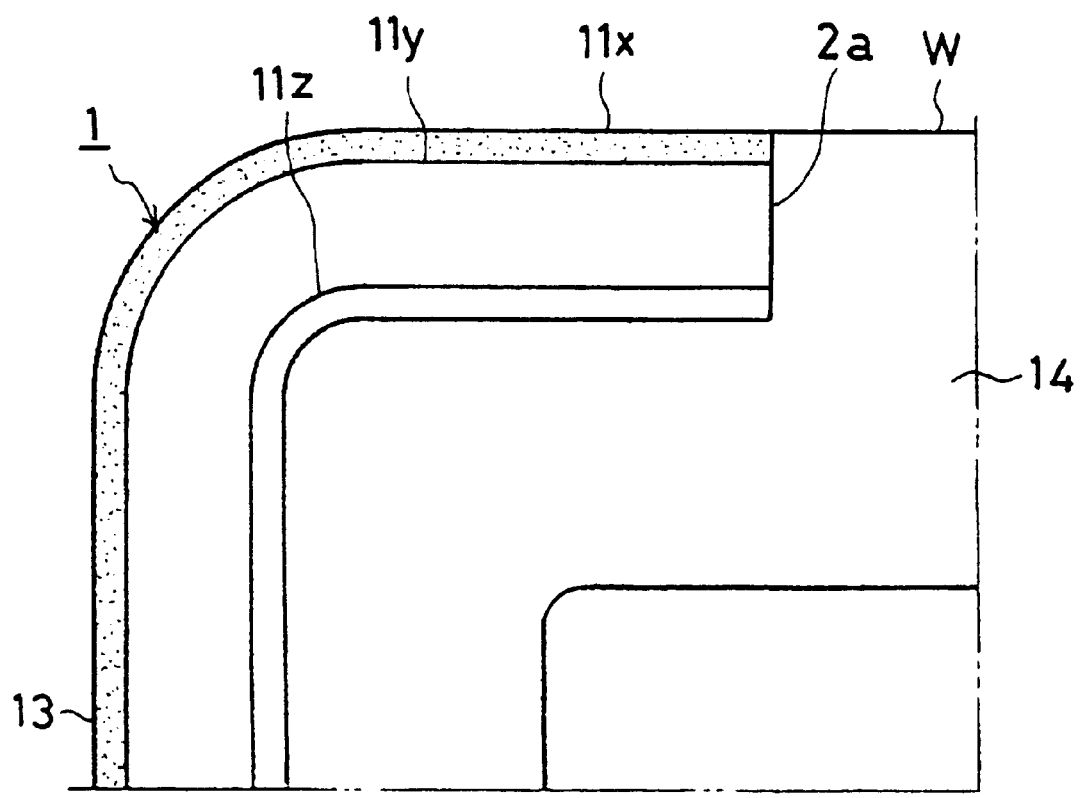
FIG. 6 is a fragmentary sectional view of housing case of a second embodiment of the first embodiment.

Then, referring to FIG. 6, the second embodiment of the first invention and a method of making thereof is explained. FIG. 6 is a fragmentary sectional view of housing case of the second embodiment. In the present embodiment, a window hole 2a is previously made in a part of body 2 of housing case 1, wherein display window W is made at the same time in the insert-forming process of body of housing case, by introducing transparent synthetic resin into the window hole 2a.

Window hole 2a is made in three-dimensionally formed synthetic resin sheet 13 in the deep-drawing process. In a case of the present embodiment, differing from the first embodiment, it is unneeded that base sheet 11y and adhesion layer 11z are transparent.

Then, as shown in FIG. 6, by injecting molten resin into a mold in the insert-forming process(refer to FIG. 4), transparent synthetic resin is inserted into the window hole 2a and as a result display window W is formed, while transparent synthetic resin layer 14 is covered with synthetic resin sheet layer except window hole 2a so that housing case 1 having the opaque surface as a whole is manufactured.

The mold is formed in such a manner that transparent synthetic resin is not inserted into button holes 3 (refer to FIG. 1) so that button holes 3 are formed into through holes.

Further, in a case where hard coating is applied on the whole surface of housing case including display window W, in order to increase scratch resistance, the coating work of hard coat may be made by the air spray coating hard coating material after forming of housing case 1.

Figure 7:
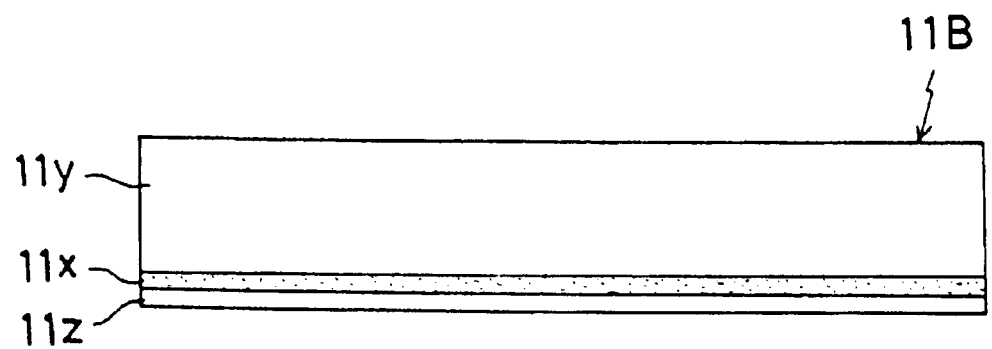
FIG. 7 is a sectional view of systhetic resin sheet used in the deep-drawing process of a third embodiment of the first invention.
Figure 8:
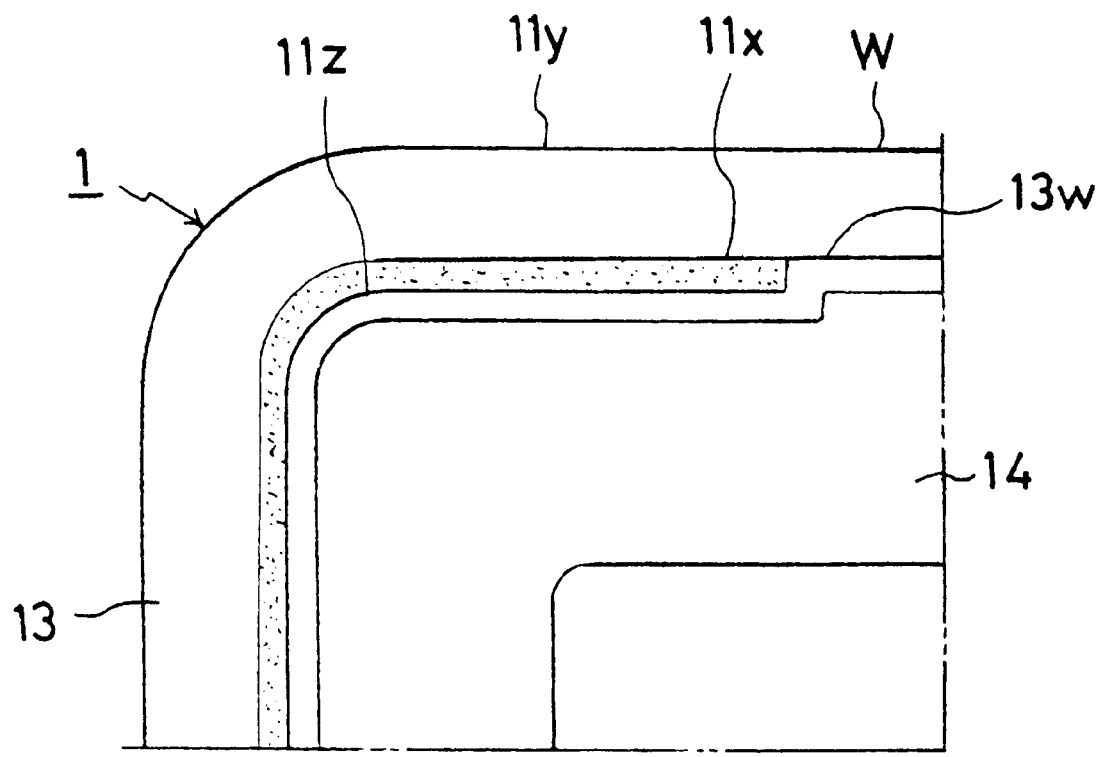
FIG. 8 is a fragmentary sectional view of housing case of the third embodiment of the first invention.

Referring to FIGS. 7 and 8, a housing case of the third embodiment of the first invention and a method of making thereof are explained. In the present embodiment, in the deep-drawing process, synthetic resin sheet 11 whose surface layer is a base sheet 11y is used.

As shown in FIG. 7, in the present embodiment, another synthetic resin sheet 11B is used which is composed of a base sheet 11y formed with transparent synthetic resin on the side of the surface of the synthetic resin sheet, printing layer 11z and an adhesion layer 11z which are laid in order under the base sheet.

Using the synthetic resin sheet B, a housing sheet 1 as shown in FIG. 8 is made through the deep-drawing process (refer to FIG. 2) and the insert-forming process(refer to FIG. 4).

FIG. 8 is a fragmentary sectional view of a housing case of the third embodiment. As shown in FIG. 8, a housing case 1 is comprised of a three-dimensionally formed outward synthetic resin sheet 13 and inward transparent synthetic resin sheet 14, wherein an area in which the printing layer 11x does not exist remains transparent as a window area, and as a result a display window W which can be seen through the window area 13W is formed of the outward transparent base sheet 11y and the inward transparent adhesion layer 11z, and the more inward transparent synthetic resin layer 14.

In a case of a housing case of the present embodiment, since printing layer 11x is covered with base sheet 11y, synthetic resin sheet 11 can with high scratch resistance can be formed. Further, since printing layer 11x is seen through transparent base sheet 11y, the depth of pattern can be given to a housing case so that a housing case of the high-grade impression can be provided.

Any of the above-mentioned first embodiment through third embodiment of the present invention is explained giving an example of a housing case for portable telephone. However, this invention is not restricted to this. It goes without saying that this invention can be applied to a housing case for varied electric device having a display window, for example, a commander of TV, a terminal equipment of pocket bell and others.

As above-mentioned, in a housing case according to the first invention, a display window can be formed at the same time when forming a body of housing case by the insert-forming method, so that high efficiency of production can be attained.

Particularly, in a case where transparent synthetic resin sheet which is covered with opaque ornamental printing layer except a window portion thereof, a display window which is comprised of unprinted portion of transparent synthetic resin layer and transparent synthetic resin layer formed on the backside of the transparent synthetic sheet layer can be formed integrally with a body of housing case through the insert-forming process.

Further, in a case where a window hole is made in a part of synthetic resin sheet, since transparent synthetic resin is introduced into the window hole when transparent synthetic resin layer is formed on the backside of the synthetic resin sheet, a display window can be formed integrally with a body of housing case.

Figure 9:
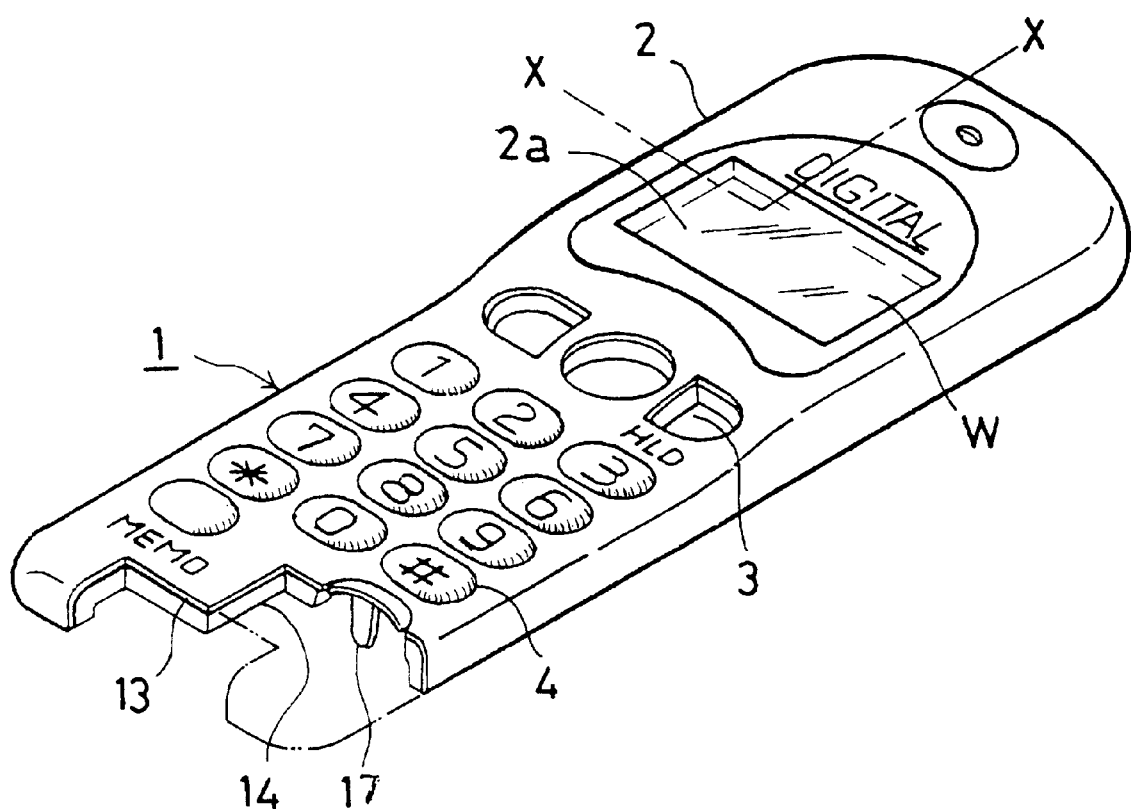
FIG. 9 is a perspective view of housing case of a first embodiment of the second embodiment.
Figure 11:
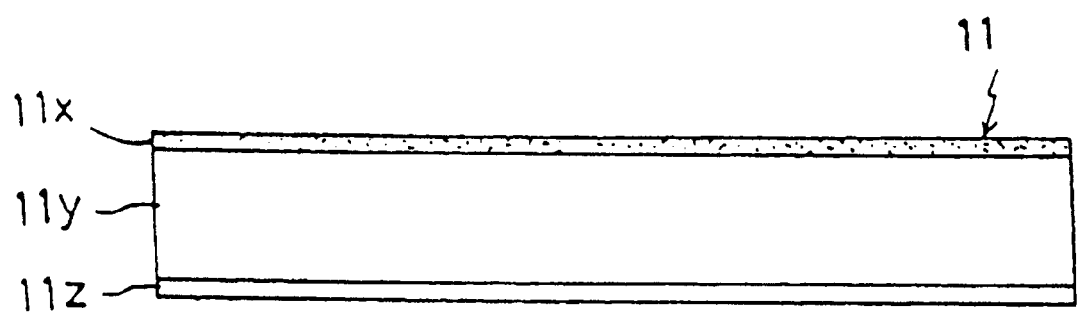
FIG. 11 is a sectional view of synthetic resin sheet.
Figure 12A:
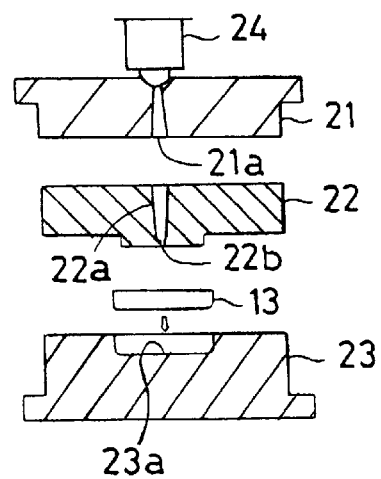
FIG. 12 is a view illustrating the insert-forming process.
Figure 12B:
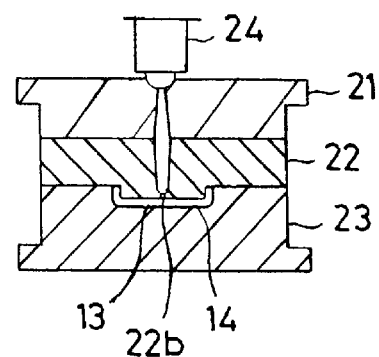
Figure 12C:
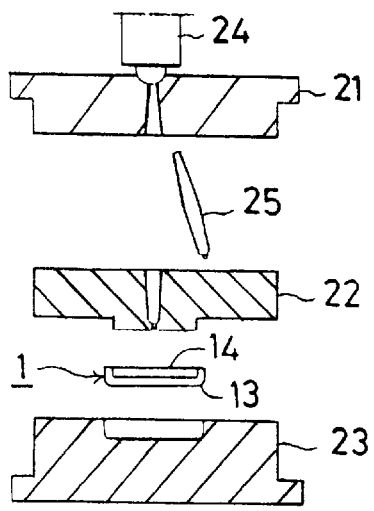
Figure 13:
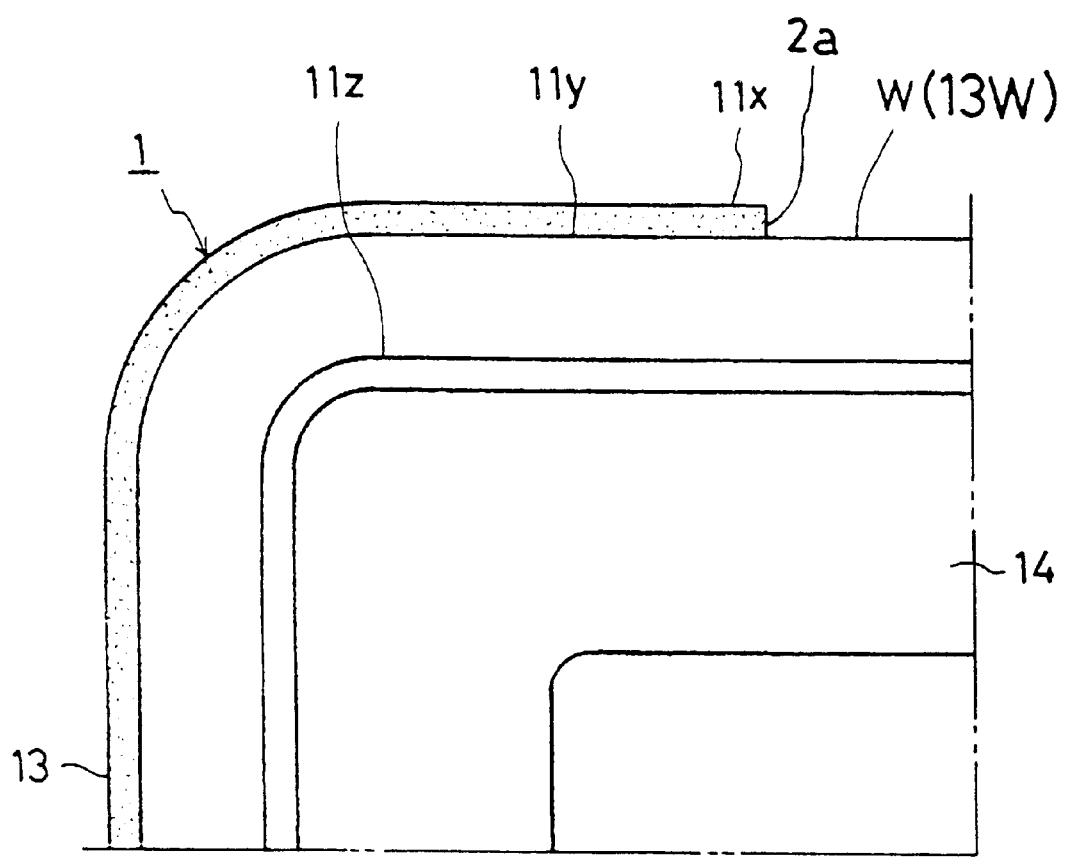
FIG. 13 is a fragmentary sectional view taken on line X—X of FIG. 9 of housing case.
Figure 14:
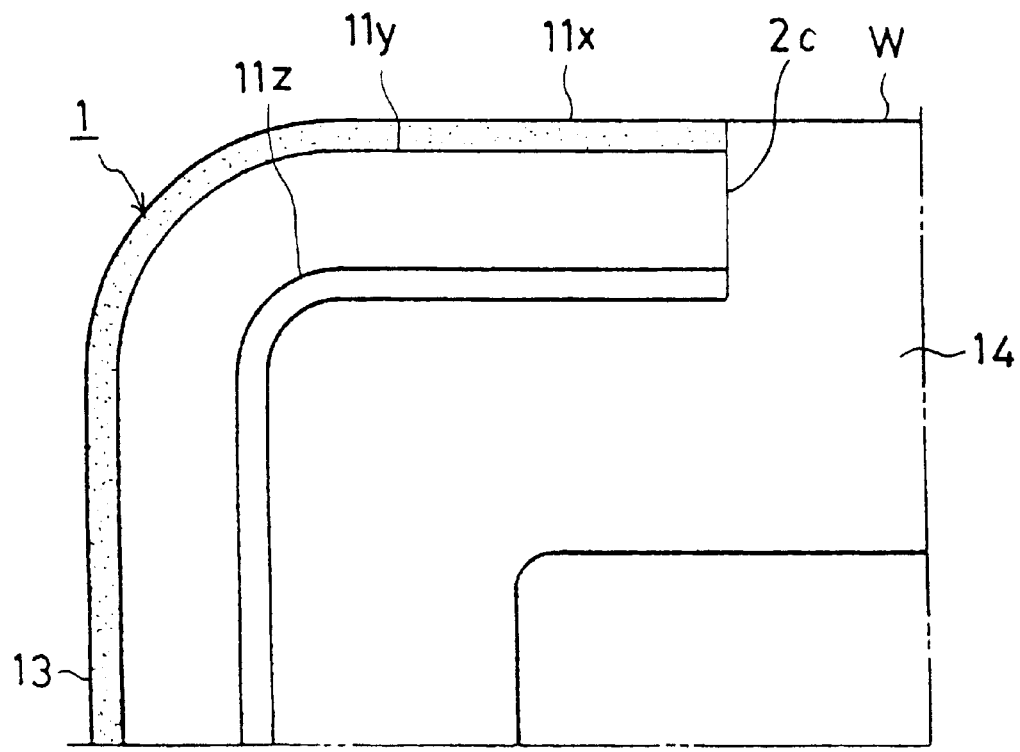
FIG. 14 is a fragmentary sectional view taken on the same line illustrating the structure of another window of housing case.
Figure 15:
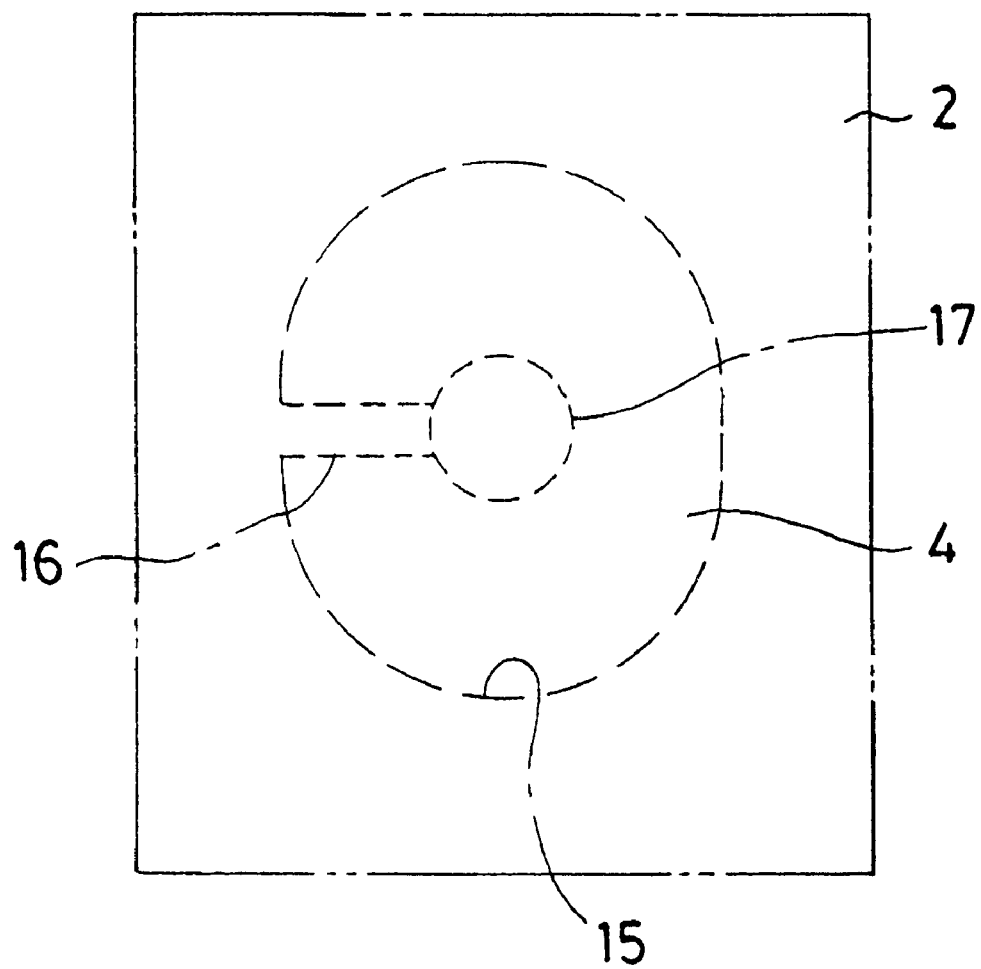
FIG. 15 is a top view of a push-button.
Figure 16A:
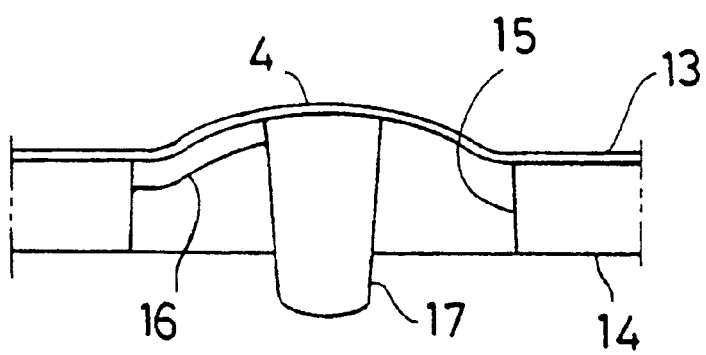
FIG. 16 is a sectional view illustrating the action of push-button.

Then, referring to FIGS. 9 to 16, the first embodiment of the second invention and a method of making thereof are explained. FIG. 9 is a perspective view of a housing case of the present embodiment. FIG. 10 is a view illustrating the deep-drawing process of synthetic resin sheet. FIG. 11 is a sectional view of synthetic resin sheet. FIG. 12 is a view illustrating the insert-forming process. FIG. 13 is a fragmentary sectional view taken on line X—X of FIG. 9 of housing case. Further, FIG. 14 is a fragmentary sectional view of another window structure of housing case taken on the same line. FIG. 15 and FIG. 16 are views illustrating a housing case of the present embodiment;

As shown in FIG. 9, in a housing case 1 of portable telephone of the present embodiment, a case body 2 is formed of synthetic resin sheet 13 positioned on the front side having ornamental printing layer and a transparent synthetic resin layer 14 positioned on the backside of housing case.

Then, a case body 12 is provided with a shadow window W, which is formed by exposing transparent synthetic resin layer 14 positioned on the backside through a window portion 2a which is an unprinted portion formed on transparent synthetic sheet layer 13, and with a plurality of button holes 3.

Further, case body 2 is provided with a plurality of button projections 4 formed in the deep-drawing process, on the backside of which movable button pieces 17 formed as a part of transparent synthetic resin layer 14 are arranged.

This housing case 1 and a back case (not shown) are held together as a unit, inside which a substrate provided with electric elements for communication, memory and push buttons which be can be projected through button holes 3 is held, by which a portable telephone is formed.

Referring to FIGS. 10 to 12, a method of making of housing case 1 is explained. Referring to FIGS. 10 and 11, a method of processing a synthetic resin sheet through deep-drawing process is explained.

As shown in FIG. 10(a), first, a synthetic resin sheet piece 11 is provided. A printing 11b is provided on a body 11a of the synthetic resin sheet piece 11, wherein the synthetic resin sheet 11 is provided particularly with an unprinted window area 11W which becomes a display window of housing case 1.

Referring to FIG. 11, the structure of synthetic resin sheet 1 is explained. FIG. 10 is a sectional view of synthetic resin sheet piece 11, which is formed of a printing layer 11x for showing characters and partial patterns, a base sheet 11y formed of synthetic resin such as PET, polycarbonate, acrylic resin, and heat-weldable adhesion layer 11z, which are laid in order from the front side, wherein base sheet 11y and adhesion layer 11z are transparent, while an unprinted portion of printing layer 11x remaims transparent as a window area 11W.

Then, as shown in FIG. 10(b), synthetic resin sheet 11 is deep-drawn by the pressure forming process in which synthetic resin sheet piece softened by being heated in a given mold is pressed. In such a way, synthetic resin sheet 12 formed by the pressure forming is made into a three-dimensionally formed sheet 12a except blank portion 12b, wherein printed portions corresponding to button portions are formed into shapes round out, respectively to form button projections 4.

Finally, as shown in FIG. 10(c), blank portion 12b is trimmed off, and button holes (not shown) are made so that synthetic resin sheet 13 can be obtained. The surface of synthetic resin sheet 13 is almost covered with printing layer 11x to be. opaque, wherein only window portion 13W remains transparent.

Referring to FIG. 12, the insert-forming process made by using the above-mentioned synthetic resin 13 is explained.

As shown in FIG. 12(a), in the insert-forming process, a mold composed of fixed side die plate 21, core side die plate 22, and cavity side die plate 23 is used. Synthetic resin sheet 13 formed through the deep-drawing process is put in cavity 23 of cavity side die plate 23, and the provision for insert-forming is made.

Then, as shown in FIG. 12(b), the respective side die plates 21, 22, and 23 are assembled and transparent synthetic resin is injected through conducting paths 21a, 22a, where synthetic resin sheet 13 is fixed on the bottom of cavity 23a of cavity side die plate 23 in such a manner that there is not a space between synthetic resin sheet 13 and the bottom, for example, by a suction means, while transparent synthetic resin is injected into a gap between synthetic resin sheet 13 and a core side die plate 22 through gate 22b, by which transparent synthetic resin layer 14 is formed.

As injected resin cools down to harden, adhesion layer 11z (refer to FIG. 11) of the backside of synthetic resin sheet 13 is held as a unit with injected resin so that housing case 1 made of synthetic resin sheet layer 13 and transparent synthetic resin layer 14 is formed, wherein movable button pieces 17 are formed as a part of transparent synthetic resin layer 14 on the backside of button projections 4 of synthetic resin sheet 13 (as to the structure of such a push button, refer to FIG. 16).

Finally, as shown in FIG. 12(c), fixed side die plate 21, core side die plate 22, and cavity side die plate 23 are separated from each other, and sprue 25 is removed from conducting paths 21a, 22a, and further housing case 1 is taken out from cavity 23a of cavity side die plate 23, by which the insert-forming process is finished.

Referring to FIG. 13, the structure of housing case 1 produced through the above-mentioned process is explained. FIG. 13 is a sectional view of a portion of housing case 1 taken on line of x—x of FIG. 9.

As shown in FIG. 13, housing case 1 is made of outer synthetic resin sheet layer 13 and inner transparent synthetic resin layer 14, wherein a window portion 13W is formed of unprinted portion of printing layer 11x. Accordingly, transparent base sheet 11y, adhesion layer 11z and transparent synthetic layer 14 are exposed through window portion 13W, so that display window W can be formed.

FIG. 14 shows an another example of display window W. As shown in FIG. 14, window hole 2c is made in synthetic resin sheet 13, in the trimming work in the deep-drawing process. In this case, the present embodiment is different from the first embodiment in that base sheet 11y and adhesion layer 11z are not needed to be transparent.

Then, by the injection of transparent synthetic resin in the insert-forming process(refer to FIG. 12), the transparent synthetic resin is introduced into window hole 2c so that display window W is formed. On the other hand, a part of synthetic resin layer 14 is covered with synthetic resin sheet layer 13 so that a generally opaque housing case 1 is produced.

Referring to FIGS. 15 and 16, the structure of bottuns of the present embodiment is explained. FIG. 15 is a top view of push button. FIG. 16 is a sectional view illustrating the action of push-button.

As shown in FIGS. 15 and 16, button projections 4 are formed into a rising shape on case body 2, while button holes 15 are made on the backside of case body 2. Movable button pieces 17 are provided in the center of the button holes 15, so that the movable button piece 17 elastically supports the backside of botun projection 4.

Figure 16B:
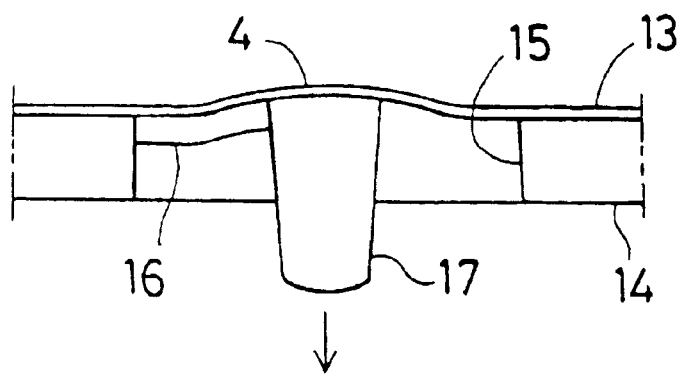

Referring to FIG. 16, the action of button projection 4 is explained. As shown in FIG. 16(b), when button projection 4 is pushed, synthetic resin sheet layer 13 is deformed against the elasticity of bridge 16. In this time, movable button piece 17 provided in the center is moved downward, which pushes a switch element arranged on s substrate (not shown ), by which a circuit is operated.

When the push of button projection 4 is released, synthetic resin sheet 13 is restored to the original state where button projection 4 is protruded on the case bodt 2, by the restoring force of itself and the elasticity of bridge 16.

As above-mentioned, a housing case 1 of the present embodiment is made through the deep-drawing process and the insert-forming process. In the housing case 1, a display window W can be formed by an unprinted portion of printing layer 11W of synthetic resin sheet layer 13 which forms a part of case body 2 through these processes, while button projections 4 as push buttons can be formed integrally with case body 2.

Accordingly, window member and push buttons, which have been hitherto made as separate parts and attached to a housing case 1 after forming of the housing case, can be formed as a part of housing case 1 in the deep-drawing process and the insert-forming process, by which higher efficiency of production as compared with conventional housing case can be attained.

Further, since movable button pieces 17 are formed of transparent synthetic resin, for example by providing a luminous body such as LED on a substrate of electronic circuit, the application of movable button pieces can be possible that button projections can be made bright by using movable button pieces 17 as optical guide.

Figure 17:
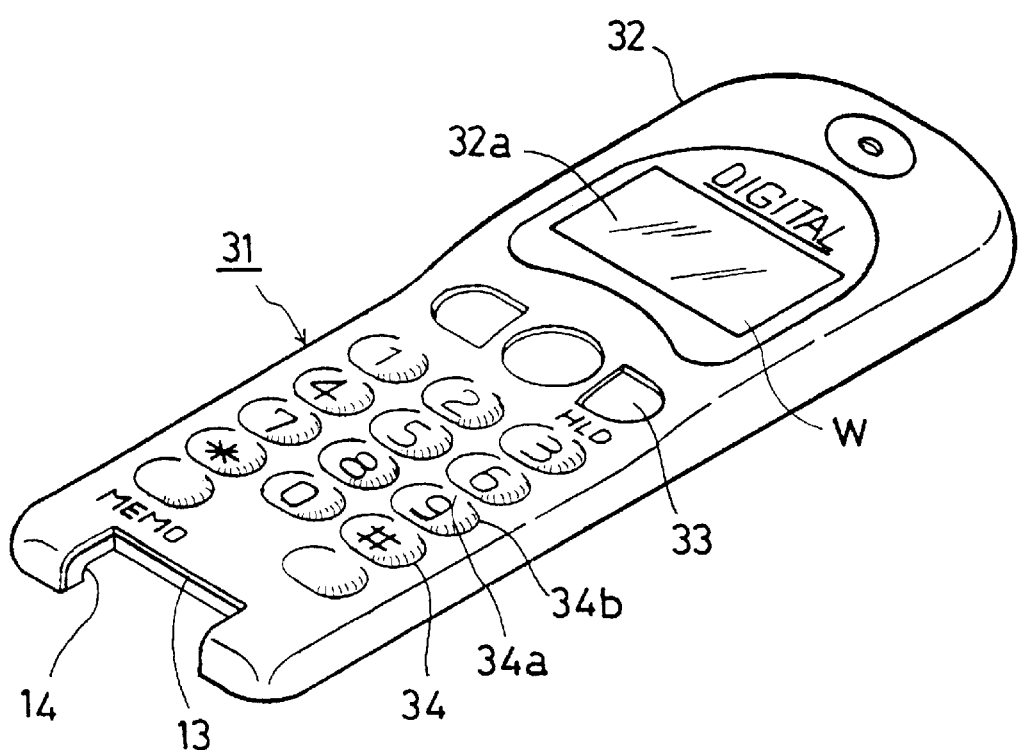
FIG. 17 is a perspective view of housing case of s second embodiment of the second invention.
Figure 18:
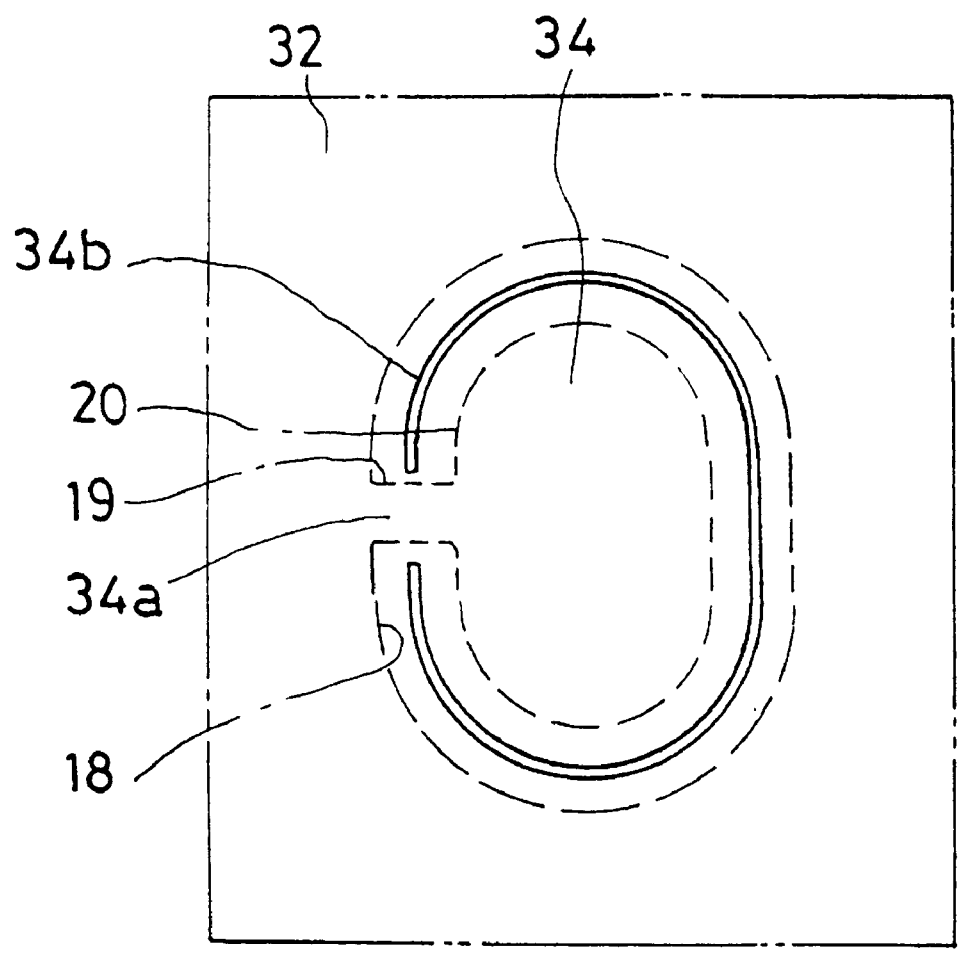
FIG. 18 is a top view of push-button of the same housing case.

Then, referring to FIGS. 17 and 18, the second embodiment of housing case according to the second invention and a method of making thereof are explained the present embodiment is characterized in that housing case is provided with slits 34b formed along the contours of button projections 34 of housing case 31 so that a moving-range of push buttons can be widened.

Figure 19:
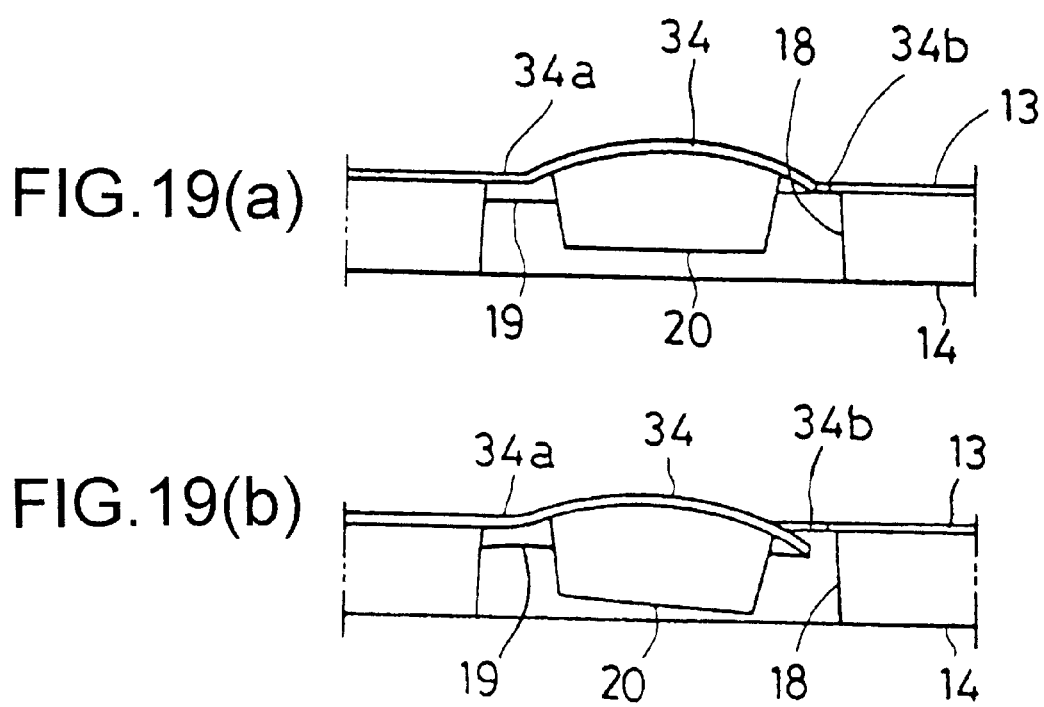
FIG. 19 is a sectional view illustrating the action of the same push-button.

FIG. 17 is a perspective view of housing case of the present embodiment. FIG. 18 is a top view of push buttons of the housing case, and FIG. 19 is a view for illustrating the action of push buttons of the housing case.

As shown in FIG. 17, in a housing case 31 of portable telephone of the present embodiment, case body 32 is formed of synthetic resin sheet layer 13 having ornamental surface in the same manner as in the first embodiment and transparent synthetic resin layer 14 of the backside.

The case body 32 is formed with a transparent display window W, which is formed of a window portion 32a formed in synthetic resin sheet layer 13 and transparent synthetic resin layer 14 of the backside, wherein a plurality of button holes 33 are made. Further, apart from these button holes 33, the case body 32 has a plurality of button projections 34 are, which are formed through the above-mentioned deep-drawing process.

Referring to FIG. 18, the structure of housing case 31 of the present embodiment is explained. As shown in FIGS. 18 and 19, slits 34b are made around button projections 34 of the present embodiment, except hinge portions 34a, differing from them in the first embodiment.

Further, button holes 18, in which transparent synthetic resin layer 14 is not formed, are provided on the backside of button projections 34, while movable button pieces 20, which are connected with transparent synthetic resin layer 14 through bridge 19, are provided in the center of the backside of button projections.

Referring to FIG. 19(b), the action of button projections 34 is explained. When button projection 34 is pushed, button projection 34 is deformed downward against the elasticity of bridge 19. In this time, because of slit 34b formed around button projection 34, a moving-range of button projection 34 becomes larger so that a stroke of button projection 34 being moved downward becomes larger.

Accordingly, housing case 31 of the second embodiment has an advantage that further favorable impression on button-operation can be given to user, in addition to the above-mentioned advantages of the first embodiment.

In housing cases of the above-mentioned first and second embodiments of the second invention, in case where hard coat is applied on the whole surface of housing case including display window W in order to improve scratch resistance, after forming of housing case, the coating work of hard coat can be made by air spray coating, wherein further hard coat can be preformed on the outside of printing layer.

Further, in housing cases of the first and second embodiments of the second invention, synthetic resin sheet piece having a printing layer on the front side thereof is used. However, when using synthetic resin sheet having transparent base sheet as the surface layer and printing layer formed on the backside of the base sheet, a housing case having excellent scratch resistance can be formed.

Further, in housing cases of the above-mentioned second embodiment of the second invention, push button area is formed into a shape that the push button area is protrudent from the surface. However it is a matter of course that if push button area has the function of going up and down as push button, it can be flat.

Further, any of the above-mentioned first and second embodiments of the second invention is explained giving examples of housing case for portable telephone. However, the present invention is not restricted to this. It goes without saying that this invention can be applied to a housing case for varied electric devices having a display window, for example, a commander of TV, a terminal equipment of pocket bell and others.

As above-mentioned, in a housing case according to the second invention, a display window and push buttons can be formed at the same time when forming a body of housing case by the insert-forming method, so that high efficiency of production can be attained.

Particularly, in a case where slits are made around buttons, the moving range of push button becomes larger so that a housing case having more excellent impression on using thereof can be provided.

Figure 20:
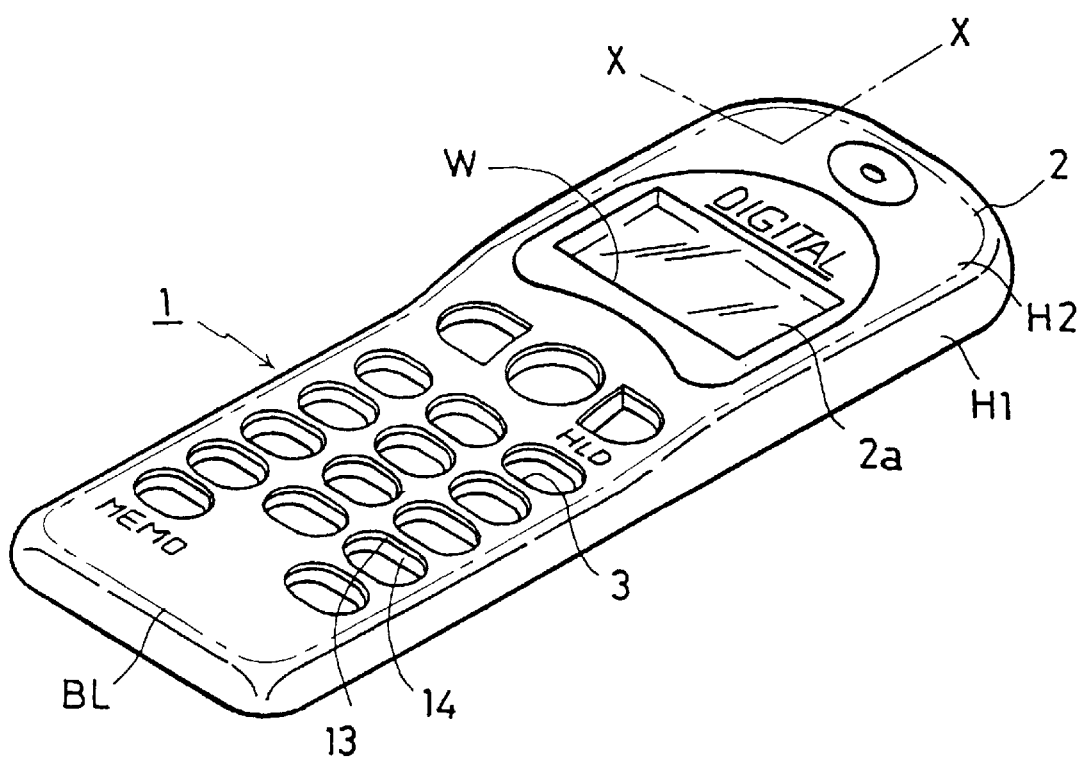
FIG. 20 is a perspective view of housing case of a first embodiment of the third invention.
Figure 22:
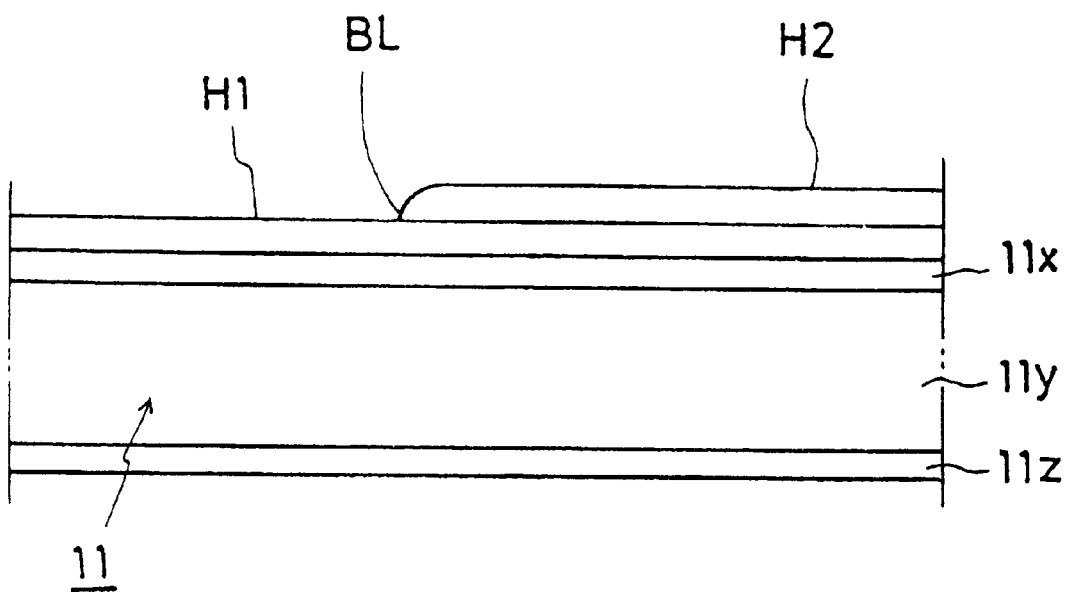
FIG. 22 is a fragmentary sectional view of synthetic resin sheet.
Figure 23:
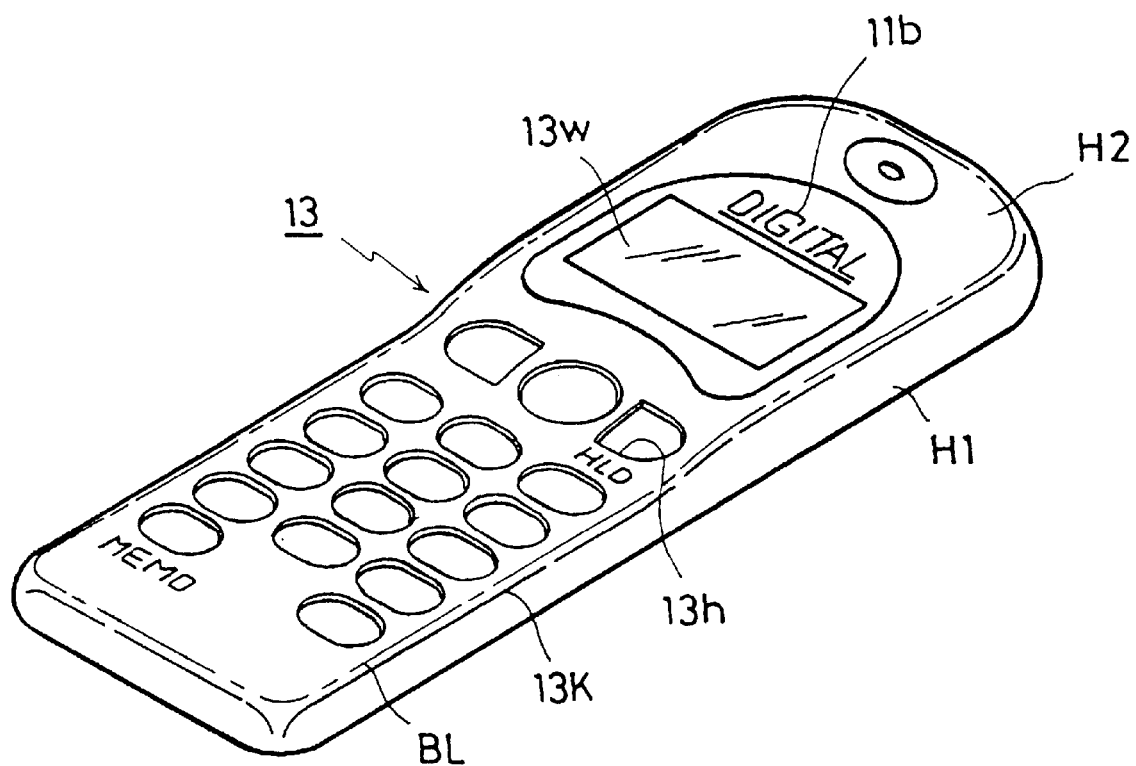
FIG. 23 is a perspective view of three-dimensionally formed sheet made through the deep-drawing process.
Figure 24A:
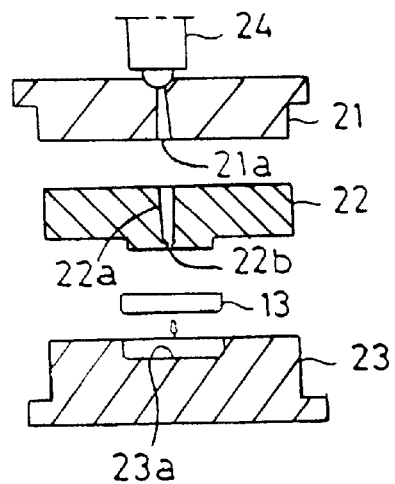
FIG. 24 is a view illustrating the insert-forming process.
Figure 24B:
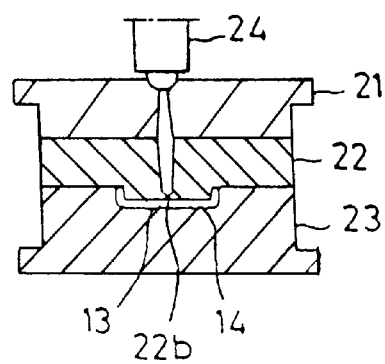
Figure 24C:
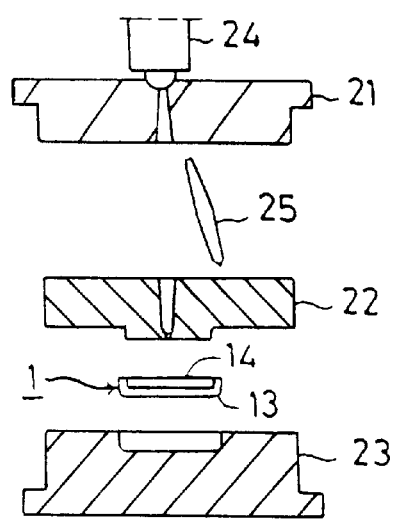
Figure 25:
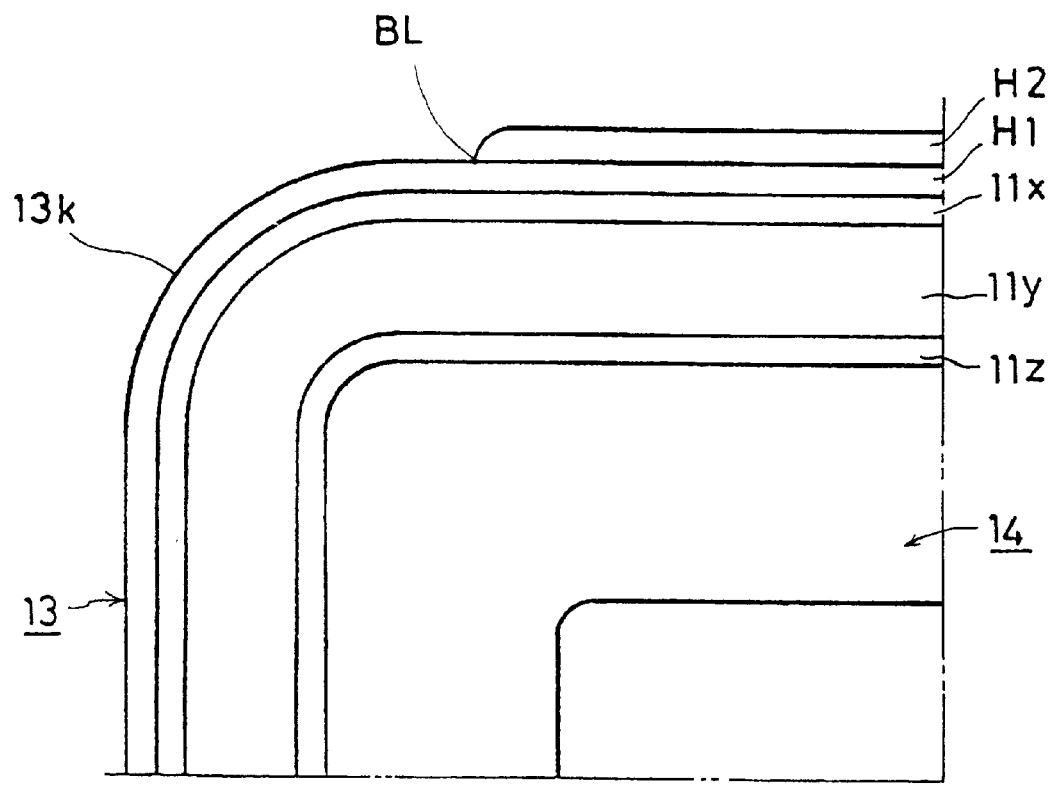
FIG. 25 is a fragmentary sectional view of housing case taken on line X—X of FIG. 20.

Then, referring to FIGS. 20 through 25, housing cases of the first embodiment of the third embodiment and a method of making thereof are explained. FIG. 20 is a perspective view of a housing case of the present embodiment. FIG. 21 is a view for illustrating the deep-drawing synthetic resin sheet. FIG. 22 is a sectional view of synthetic resin sheet piece. FIG. 23 is a perspective view of three-dimensionally formed sheet through the deep-drawing process. FIG. 24 is a view for illustrating the insert forming process. FIG. 25 is a fragmentary sectional view of housing case taken on line X—X of FIG. 20.

As shown in FIG. 20, a housing case 1 of portable telephone of the present embodiment includes a case body 2 which is formed of a three-dimensionally formed outer synthetic resin sheet 13 and an inner transparent synthetic resin 14.

Then, the case body 2 is provided with a transparent display window W, which is formed of a window hole 2a made in the three-dimensionally formed synthetic resin sheet 13 and an area of the inner transparent synthetic resin sheet 14 seen through the window hole, and with a plurality of button holes 3.

The housing case 1 and a back case (not shown) are held together as a unit, inside which a substrate provided with electric elements for communication, memory and push buttons which be can be inserted into button holes 3 is held, by which a portable telephone is formed.

Referring to FIGS. 21 to 23, a method of making of a housing case 1 of the third invention is explained. First, referring to FIGS. 21 and 22 a method for producing synthetic resin sheet by the deep-drawing process is explained.

As shown in FIG. 21(*a*), first, synthetic resin sheet piece 11 is produced. Previously, a body 11*a* of the synthetic resin sheet piece 11 is provided with printing 11*b*, and with transparent area 11W (refer to FIG. 20) which is unprinted and becomes a display window W of housing case 1.

Two hard coating layers H1, H2 are applied on the surface of the synthetic resin sheet piece 11 with printing 11*b* so as to cover the printing 11*b*, by printing method Low-hardness hard coating layer H1 is applied on the whole surface of synthetic resin sheet piece 11, while high-hardness hard coating layer H2 is applied on the low-hardness hard coating layer only in a portion which becomes the front of housing case through the deep-drawing process, that is inside a border line B1.

Referring to FIG. 22, the structure of synthetic resin sheet 11 is explained. FIG. 22 is a sectional view of synthetic resin sheet 11, which is formed of printing layer 11*x* for showing characters and partial patterns, a base sheet 11*y* formed of synthetic resin such as PET, polycarbonate, acrylic resin, and heat-weldable adhesion layer 11*z*, which are laid in order from the front side.

Then, the low-hardness hard coating layer H1 is formed so as to cover the printing layer 11*x*, by which the printing layer 11*x* is protected. Further, a part of low-hardness hard coating layer H1 is laminated with high-hardness hard coating layer H2.

The area in which low-hardness hard coating layer H2 is laminated with high-hardness hard coating layer H1 is corresponding to the front of three-dimensionally formed synthetic resin sheet through the deep-drawing process. The border line BL of the area is set on the inside than edges between the front and the side of the three-dimensionally formed synthetic resin sheet.

Then, as shown in FIG. 21 (*b*), the above-mentioned sheet piece 11 is heated in a given mold, and deep-drawing-formed by the pressure forming method in which softened synthetic resin sheet piece 11 is pressed with high pressure air. In such a way, a pressure-formed synthetic resin sheet, namely a three-dimensionally formed synthetic resin sheet piece 12 including a body 12*a* and a blank portions 12*b* is made.

In this time, high-hardness coating layer H2 is formed only in the front of the three-dimensionally formed synthetic resin sheet piece 12, while the high-hardness hard coating layer H2 is not applied on a part of edges which is formed through the deep-drawing process. Therefore, It does not happen that the edges become thicker by the hard coating layer so that faulty forming is prevented.

Finally, as shown in FIG. 21(*c*), blank portion 12*b* is trimmed off, and at the same time holes are made in the given positions, by which the three-dimensionally formed synthetic resin sheet 13 with button holes 13*h* is formed.

FIG. 23 is a perspective view of the three-dimensionally formed synthetic resin sheet 13, which includes the front having printing 11*b* and the side around the front. The front is almost made opaque by printing 11*b*, however, a portion of a window area 13W is an unprinted portion, which remains transparent. Further, a plurality of button holes 13*h* are made in the three-dimensionally formed synthetic resin sheet 13 in the above-mentioned trimming process.

As for hard coating layers, a low-hardness hard coating layer H1 is applied on the whole surface of three-dimensionally formed synthetic resin sheet 13, while high-hardness hard coating layer H2 is applied only on the area inside border line BL set inside edges 13*k* of the front of the three-dimensionally formed synthetic resin sheet 13. Accordingly, high scratch resistance is given in the front in which printing 11*b* is concentratively provided so that scratch is apt to be formed.

Referring to FIG. 24, the insert-forming process using the above-mentioned three-dimensionally formed synthetic resin sheet 13 is explained.

As shown in FIG. 24(*a*), in the insert-forming process, a mold formed of a fixed side die plate 21, a core side die plate 22, and a cavity side die plate 23 is used, wherein the three-dimensionally formed synthetic resin sheet 13 made through the deep-drawing process is put in a cavity 23*a* of cavity side die plate 23, by which the provision for insert-forming is made.

Then, as shown in. FIG. 24(*b*), the respective side die plates 21, 22, 23 are assembled to a mold and transparent synthetic resin is injected through conducting paths 21*a*, 22*a* of fixed side die plate 21 and core side die plate 22, wherein the three-dimensionally formed sheet 13 is fixed to the bottom of cavity 23*a* of cavity side die plate 23 in such a manner that there is not a space between three-dimensionally formed synthetic resin sheet 13 and the bottom, for example, by a suction means, while transparent synthetic resin is injected into a gap between three-dimensionally formed synthetic resin sheet 13 and a core side die plate 22 through gate 22*b*, by which transparent synthetic resin layer 14 is formed.

As injected resin cools down to harden, adhesion layer 11*z* (refer to FIG. 22) of the backside of three-dimensionally formed synthetic resin sheet 13 is held as a unit with injected resin so that housing case 1 made of synthetic resin sheet layer 13 and transparent synthetic resin layer 14 is formed.

Finally, as shown in FIG. 24(*c*), fixed side die plate 21, core side die plate 22, and cavity side die plate 23 are separated from each other, and sprue 25 is removed from conducting paths 21*a*, 22*a*, and further housing case 1 is taken out from cavity 23*a* of cavity side die plate 23, by which the insert-forming process is finished.

Referring to FIG. 25, the structure of housing case 1 produced through the above-mentioned process is explained. FIG. 25 is a sectional view of a portion of housing case 1 taken on line of x—x of FIG. 20.

As shown in FIG. 25, housing case 1 is made of outer three-dimensionally formed synthetic resin sheet 13 and inner transparent synthetic resin 14. The three-dimensionally formed synthetic resin sheet 13 is formed of printing layer 11*x*, base sheet 11*y* and adhesion layer 11*z*, which are laid in order from the outside, and further the outside of the three-dimensionally formed synthetic resin sheet 13 is provided with hard coating layer H1, H2 so as to increase the scratch resistance, wherein low-hardness hard coating layer H1 is formed on the whole surface, namely the front and the side of the three-dimensionally formed synthetic resin sheet 13, and high-hardness coating layer H2 is formed on the low-hardness coating layer H1 in the front area within border line BL set on the inside of edges 13*k* of the three-dimensionally formed synthetic resin sheet 13.

As above-mentioned, according to housing case 1 of the present embodiment, ig. 14, since the adjustment of hardness of hard coating layers is made, even if synthetic resin sheet is deep-drawn into a three-dimensional form, the quality of forming in edges of three-dimensional form is not affected by the existence of hard coating layers.

Accordingly, since hard coating layers H1, H2 can be previously formed as a part of synthetic resin sheet 11, it is unnecessary that hard coating layers are applied on three-dimensionally formed synthetic resin sheet in the subsequent process so that the hard coating treatment of synthetic resin sheet can be made in a very simple process.

Specially, in the present embodiment, the adjustment of hardness on hard coating layers are made using two sorts of hard coating layers, low-hardness coating layer H1 and a high-hardness coating layer H2, so that a desired hardness can be given in a desired area.

Further, in the present embodiment, a display window having hard coating layer previously formed on the display window can be formed integrally with a case body using transparent synthetic resin sheet. Therefore, a complicated process as in the past becomes useless that a separate part of window is laminated with hard coating layer, and thereafter attached to a case body, so that a housing case can be formed at the high efficiency of production.

Figure 26:
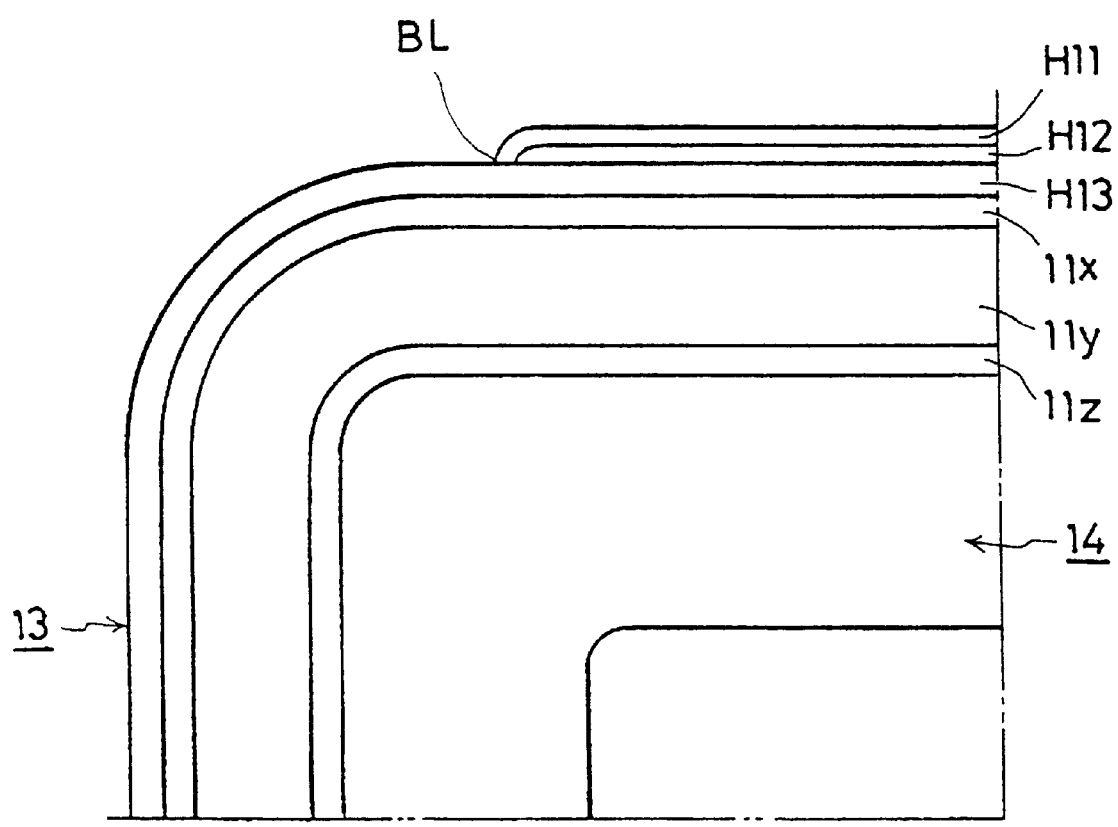
FIG. 26 is a fragmentary sectional view of housing case of a second embodiment of the third invention.

Then, referring to FIG. 26, the second embodiment of the third invention and a method of making thereof are explained. FIG. 26 is a sectional view of housing case taken on line x—x (of FIG. 20) in the same manner as in FIG. 25.

As shown in FIG. 26, in a housing case of the present embodiment, the hardness of hard coating layers is controlled by one sort of low-hardness coating layer, differing from the first embodiment of the third invention in which low-hardness hard coating layer and hard hardness coating layer are used.

Namely, the whole surface of synthetic resin sheet 13 is covered with a single layer of first low-hardness hard coating layer H13, and the front area inside border line BL is laminated with double layers of low-hardness hard coating layer H11 and H12, so that the front of three-dimensionally formed synthetic resin sheet 13 is covered with a thicker hard coat, and edges and sides thereof are covered with thinner hard coat.

In such a way, in a housing case of the, present embodiment, the adjustment of hardness of hard coating layer can be simply made by changing the number of layers of hard coat of the same kind depending on places to be laminated.

In housing cases of the first and second embodiments of the third invention, a synthetic resin sheet piece having a printing layer as the surface layer is used. However, in a case where a synthetic resin sheet piece having transparent base sheet layer as the surface layer in which a printing layer is formed on the back side thereof is used, a housing case having excellent scratch resistance can be formed.

Further, any of the above-mentioned first and second embodiments of the third invention is explained giving examples of housing case for portable telephone. However, the present invention is not restricted to this. It goes without saying that this invention can be applied to a housing case for varied electric devices having a display window, for example, a commander of TV, a terminal equipment of pocket bell and others.

As above-mentioned, according to a housing case of the third invention, a hard coating layer can be previously applied on synthetic resin sheet used in the insert-forming process, so that a housing case having the surface covered with a hard coat can be made through the simpler producing process.

Specially, in case of using, as synthetic resin sheet, the three-dimensionally formed synthetic resin sheet made through the deep-drawing process, since a strong hard coat is formed on the front of the three-dimensionally formed synthetic resin sheet in which high scratch resistance is needed, and a weak hard coat is formed on edges thereof which deform largely in the deep-drawing process,therefore being difficult to be processed, the influence of hard coating layer of when being formed through the deep-drawing process can be lessened so that a housing case having sharp edges can be formed with good quality of forming.

Figure 27:
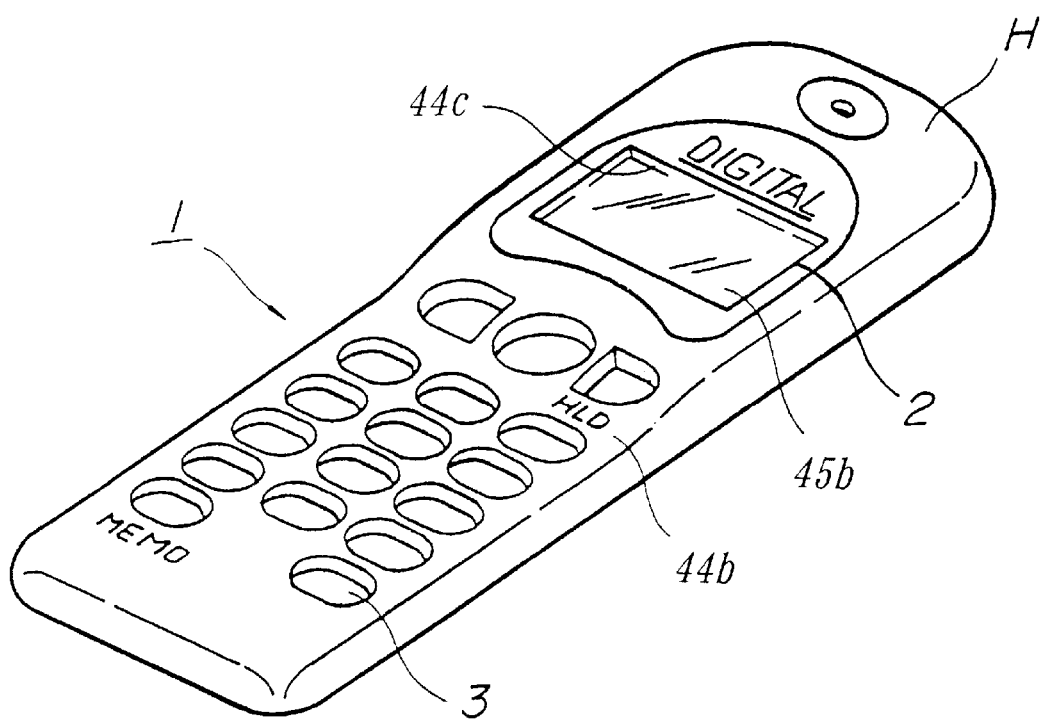
FIG. 27 is a perspective view of housing case according to the fourth invention.
Figure 28:
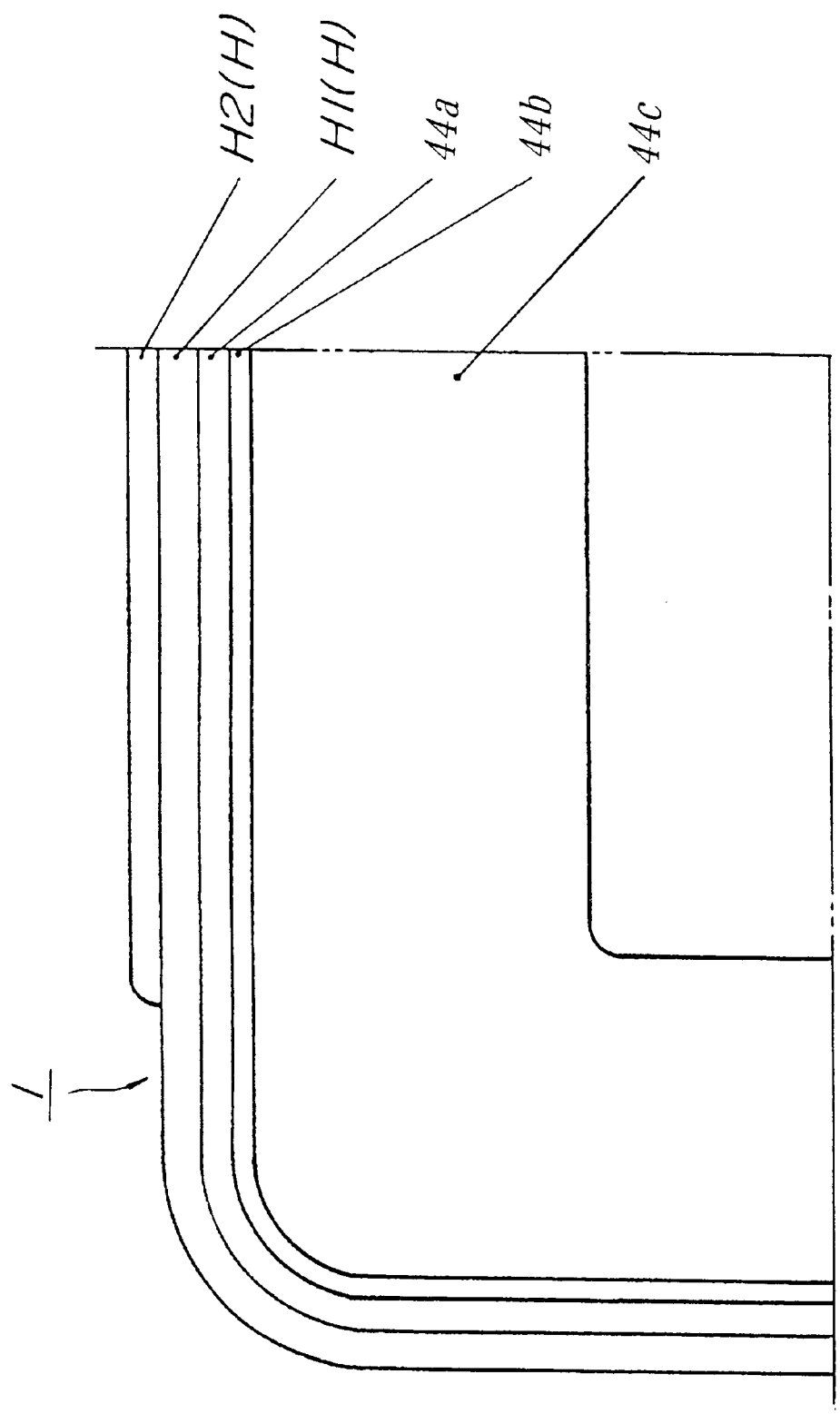
FIG. 28 is a sectional view of a part of housing case.
Figure 29:
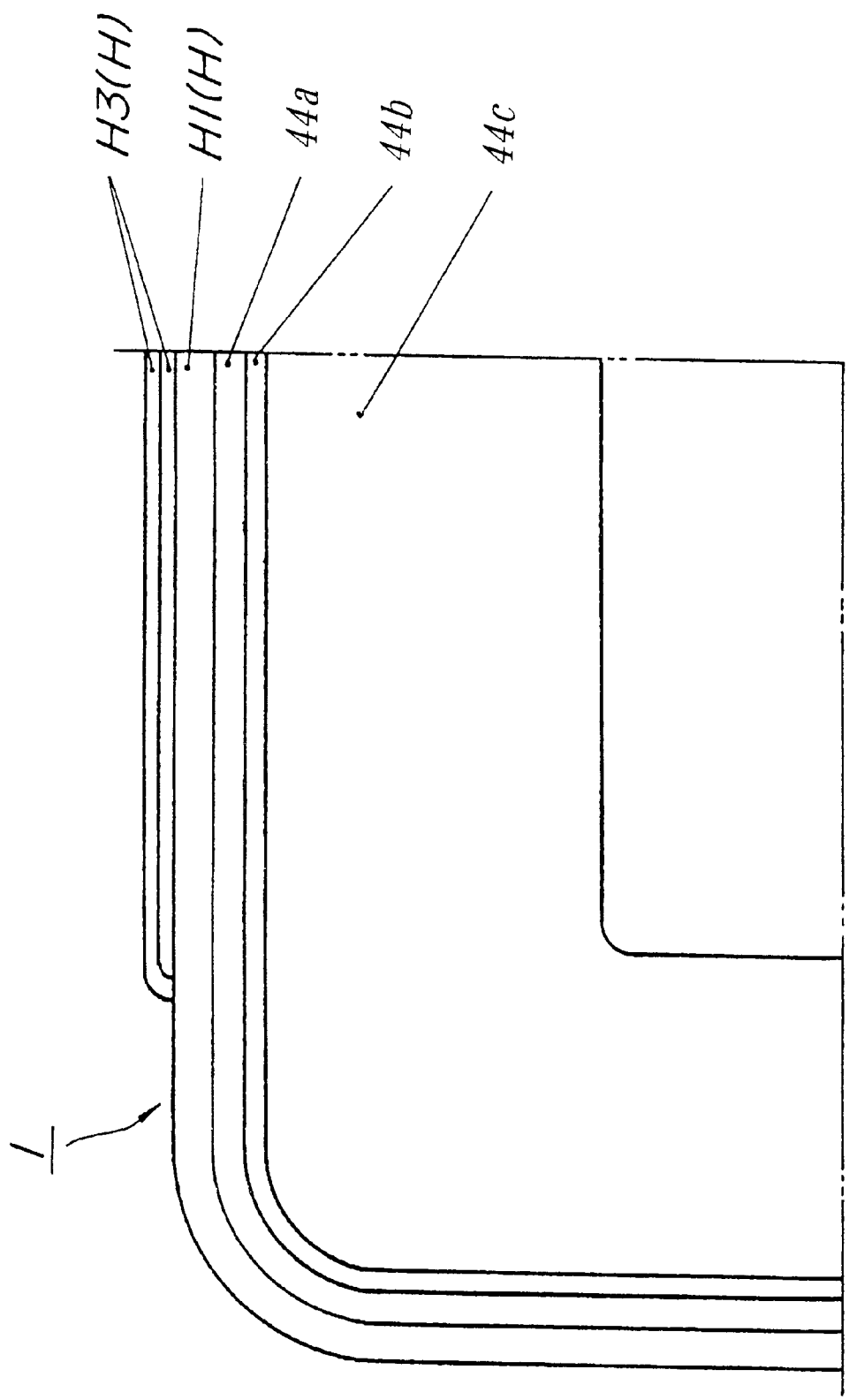
FIG. 29 is a sectional view of another part of housing case.

Then, referring to FIGS. 27 to 32, a housing case of the first embodiment of the fourth invention and a method of making thereof are explained. FIG. 27 is a perspective view of housing case of the first embodiment. FIG. 28 is a sectional view of housing case. FIG. 29 is a top view of continuous film.

As shown in FIG. 27, a housing case 1 of the present embodiment is a housing of electronic apparatus such as portable telephone, which includes a display window 2 and button holes 3. Further, as shown in FIGS. 28 and 29, a housing case 1 has the structure including hard coating layers H (high-hardness layer and low-hardness layer), printing layer 44a, adhesion layer 44b, and transparent synthetic resin layer 44c which are laid in order from the surface.

Hard coating layers H is formed of a high-hardness layer and a low-hardness layer, wherein the whole surface of housing case is covered with low-hardness hard coating layer H1. Further, difference in high-hardness and low-hardness of hard coating layers H depending on places is made by high-hardness hard coating layer H2 being applying on the low-hardness hard coating layer H1 in the area of a display window and the circumference thereof.

In the structure of hard coating layer, instead of high hard coating layer H2, double layers of low-hardness coating layers H3 can be used. Namely, in this case, the adjustment of hardness of hard coating layer can be made by using two low-hardness hard coating layers H3, wherein the number of layers is changed depending on places, by which the adjustment of hardness of hard coating layers can be simply made.

Further, unprinted portion 45b in which printing is not made is formed in a part of printing layer 44a in such a manner that transparent synthetic resin layer 44c can be seen, by which transparent display window 2 is formed.

The housing case 1 and a back case (not shown) are held together as a unit, inside which a substrate provided with electric elements for communication, memory and push buttons which be can be inserted into button holes 3 is held, by which a portable telephone is formed.

Figure 30:
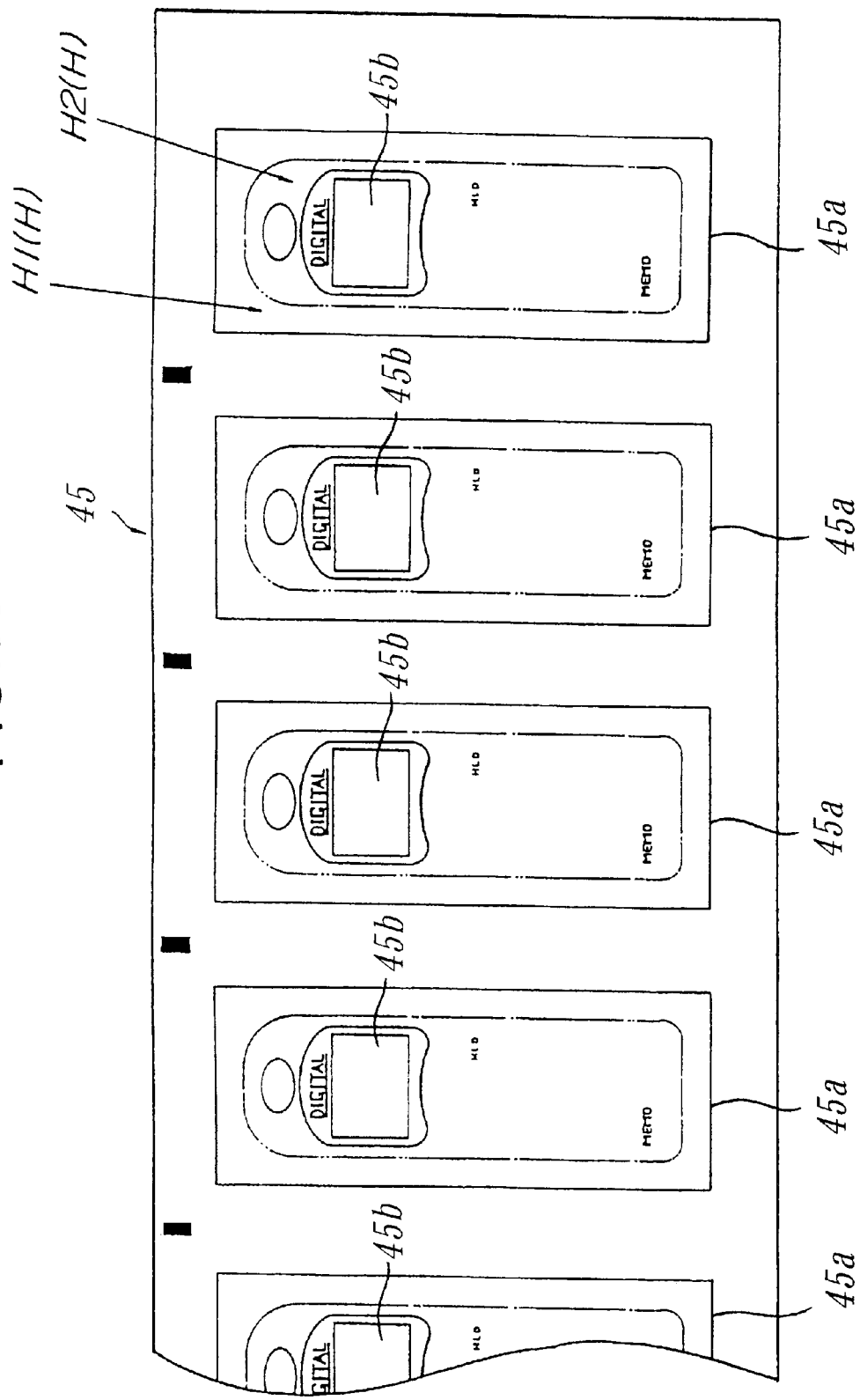
FIG. 30 is a top view of continuous film.
Figure 31:
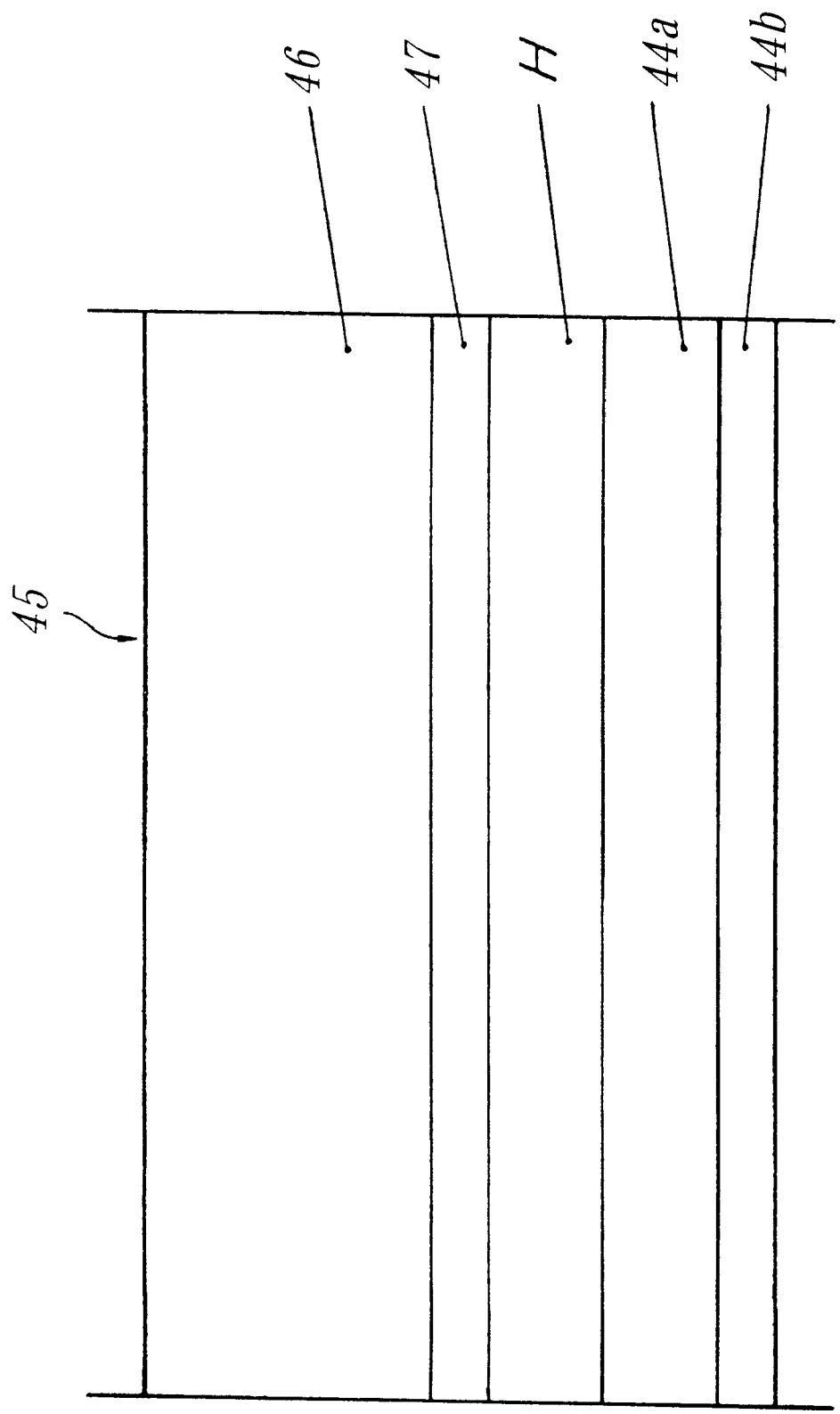
FIG. 31 is a sectional view of continuous film.

Then, referring to FIGS. 30 to 32, a method of making of a housing case 1 is explained in such a method, continuous film 45 having ornamental patterns is provided, and successively fed to a mold M, in which transparent, synthetic resin layer 44 is formed on the continuous film 45.

Referring to FIGS. 30 and 31, the structure of continuous film 45 is explained FIG. 30 is a top view of the continuous film. FIG. 31 is a sectional view of the continuous film. As shown in FIG. 30, continuous film 45 is belt-shaped transparent sheet, on which a plurality of independent printing patterns 45a are arranged at equal distances.

The respective patterns 45a are formed of the above-mentioned printing layers 44a (refer to FIG. 28), which is covered with hard coating layers H, of which low-hardness hard coating layer H1 covers the whole of the respective printing patterns 45a, while high-hardness hard coating layer H2 covers only the center areas of the respective patterns which becomes the front of housing case 1.

This is made to give high scratch resistance to the front which is apt to take scratches when using, because of printing layers being centered at the front. Continuous film 45 is deep-drawn into a three-dimensional form through the under-mentioned inmold-printing-forming process, wherein high-hardness hard coating layer H2 is formed on only an area of printing pattern 45a which becomes the front of housing case in such a manner that high-hardness hard coating layer H2 and an areas which becomes edges when deep-drawing are not superimposed. Accordingly, in edges which are formed in such a way, the badness of forming such as cracks is not generated in hard coating layer H.

Further, unprinted portion 45b, which becomes a portion of a display window, is formed in the fixed portion of each printing pattern 45a, which unprinted portion remains transparent.

Referring to FIG. 31, the structure of section of continuous film 45 is explained. The continuous film 45 is comprised of transparent base film 46 of formed of synthetic resin material such as PET, release layer 47, hard coating layer H, printing layer 44a which shows characters and partial patterns and heat-weldable adhesion layer 44b, which are laid in order from one side.

Figure 32A:
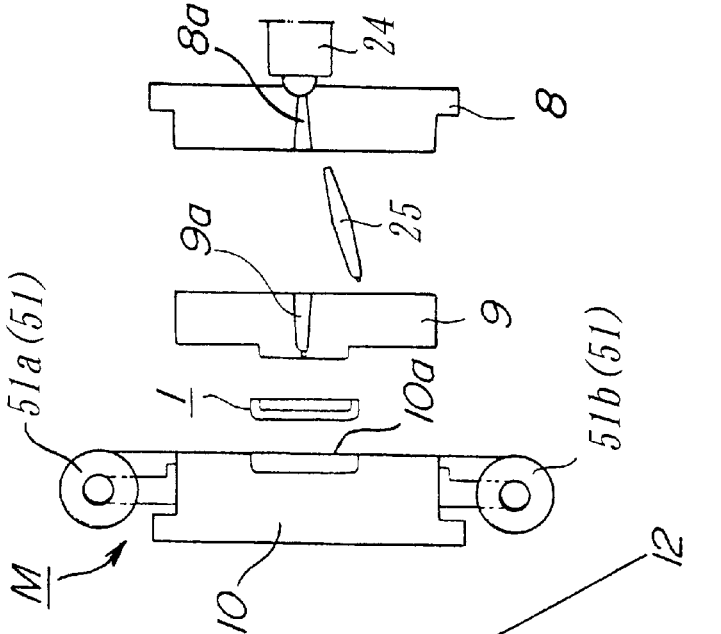
FIG. 32 is a view illustrating the in-mold-print-forming process.

Referring to FIG. 32, the inmold-printing-forming-forming process using the above-mentioned continuous film 45 is explained as shown in FIG. 32(a), in the inmold-printing-forming process, an injection mold M composed of a fixed side die plate 8, a core side die plate 9, and a cavity side die plate 10. The cavity side die plate 10 is provided with a forwarding roll 51a at one side and with a winding roll 51b, and a winder 51 is formed of the forwarding roll 51a and the winding roll 51b.

Continuous film 45 is wound on the forwarding roll 51a. The top end of the continuous film is unwound from the forwarding roll 51a, sent through the inside of injection mold M, namely through between the cavity side die plate 10 and the core side die plate 9 to the winding roll 51b, and wound to the winding roll 51b, by which the preparation is finished.

First, the winding roll 51 is operated to intermittently send continuous film 45 through between the cavity side die plate 10 and the core side die plate 9 to the winding roll 51b, wherein the intermittent sending of continuous film is made in such a manner that the respective printing pattern 45a coincides in order with the cavity 10a of cavity side die plate 10.

Figure 32B:
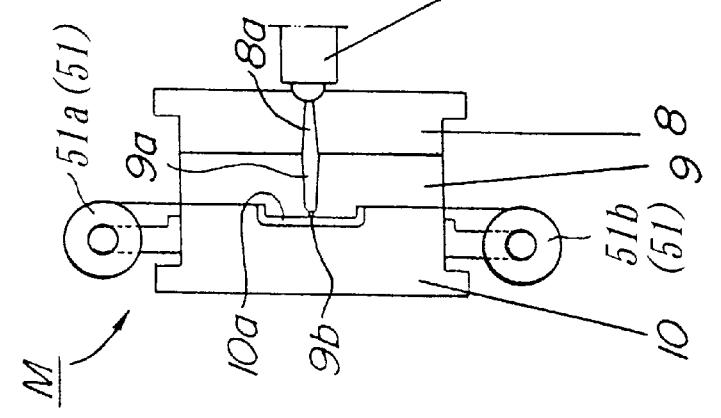

Then, as shown in FIG. 32b, side die plates 8, 9, 10 are laid one on top of another, and transparent synthetic resin is injected from an injection nozzle 24 through conducting paths 8a, 9a of core side die plate 9, wherein continuous film 45 is pressed against the cavity 10a of cavity side die plate 10 by injected transparent synthetic resin, while the continuous film is deep-drawn by heat and pressure of transparent synthetic resin. As injected transparent synthetic resin cools down to harden, transparent synthetic resin layer 44c is formed. The formed transparent synthetic resin layer is held together with adhesion layer 44b of the back side of continuous film 45 as a unit, by which a housing case 1 is formed.

The above-mentioned button holes 3 are needed to be made in the housing case 1. These button holes are made by forming the button holes with projections corresponding to button holes which are provided in the core side die plate.

Figure 32C:
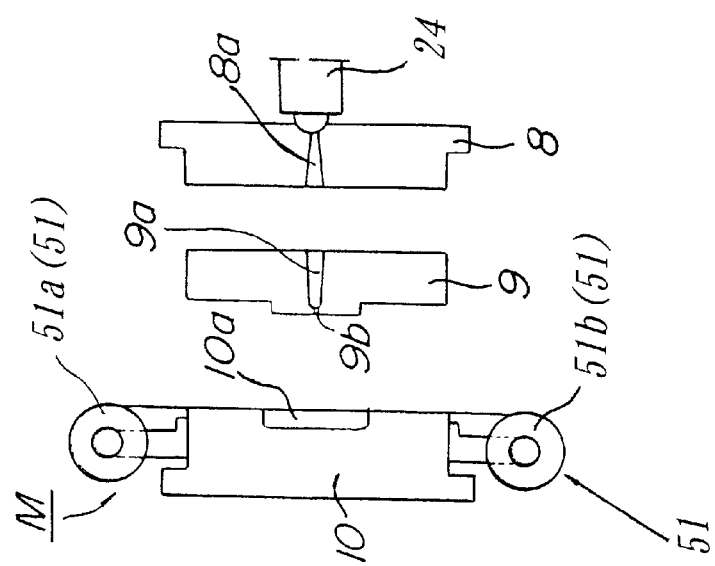

Finally, as shown in FIG. 32(c), fixed side die plate 8, core side die plate 9, and cavity side plate 10 are separated from each other, sprue 25 is removed from conducting paths 21a, 22a, and further housing case 1 is taken out from cavity 10a of cavity side die plate 10.

In this time, when taking out the housing case 1 from cavity 10a, hard coating layer H, printing layer 44a, and adhesion layer 44b of continuous film 45 is removed from base film 46 to transparent synthetic resin layer 44 as a part of housing case 1, through release layer 47, wherein base film 46 with release layer 47 is sent toward winding roll 51b, and recovered.

In such a way, the printing pattern 45a of continuous film is sent in order to cavity 10a, and the above-mentioned inmold-printing-forming process is repeated.

According to a housing case 1 of the present embodiment, a display window 2, which is formed of unprinted portion 45b of continuous film and transparent synthetic resin layer 44c and covered with hard coating layer H, can be formed integrally with a body of housing case 1. Therefore, high efficiency of production can be expected as compared with conventional product in which display window 2 and body of housing case are produced separately.

Further, in the present embodiment, low-hardness hard coating layer H1 is formed on a portion of printing pattern corresponding to the edges of housing case 1, and high-hardness hard coating layer H2 is formed on a portion of printing pattern corresponding to the front of housing case 1, by which unevenness of hardness of hard coating layer H is formed depending on regions of housing case. Therefore, even when continuous film 45 is deep-drawn into a three-dimensional form, the badness of forming is not generated in edges, and a housing case 1 having sufficient hardness in the front can be obtained.

Further, any of the present embodiments is explained giving examples of housing case for portable telephone. However, the present invention is not restricted to this. It goes without saying that this invention can be applied to a housing case for varied electric devices having a display window, for example, a commander of TV, a terminal equipment of pocket bell and others.

As above-mentioned, according to a housing case of the fourth invention, by using a continuous film which is formed of a base film, a release layer, hard coating layer, printing layer and adhesion layer which are laid in order on the base film, a housing case can be continuously formed, so that high efficiency of production can be achieved.

Further, by unprinted portion of continuous film and transparent synthetic resin layer, a display window covered with hard coating layer can be formed integrally with a body of housing case. Therefore, high efficiency of production can be expected as compared with conventional product in which display window 2 and body of housing case are produced separately.

Further, unevenness of hardness of hard coating layer H is formed depending on regions of housing case. Therefore, even when continuous film 45 is deep-drawn into a three-dimensional form, the badness of forming is not generated in edges, and at the same time a housing case 1 having sufficient hardness in the front can be obtained.

What is claimed is:

1. A housing case for apparatus having both a display window and opaque ornamental layer on the surface of housing case, characterized in that the housing case comprises a transparent synthetic resin sheet, said synthetic resin sheet is provided with opaque printing layer in a pattern having unprinted portion corresponding to the display window, the synthetic resin sheet is formed into a shape of housing case, and that a formed product of transparent synthetic resin forming a body of housing case together with the formed synthetic resin sheet is provided on the backside of the formed synthetic resin sheet.

2. A housing case for apparatus having both a display window and opaque ornamental layer on the surface of housing case, characterized in that the housing case comprises a synthetic resin sheet, said synthetic resin sheet is provided with opaque printing layer and with a window hole made in an area corresponding to a display window of housing case, the synthetic resin sheet is formed into a shape of housing case, and that a formed product of transparent synthetic resin forming a body of housing case together with the formed synthetic resin sheet and a transparent window part formed integrally with the formed product of transparent synthetic resin and filling the window hole are provided on the backside of the formed synthetic resin sheet.

3. A housing case as claimed in claim 2, wherein hard coating layer is applied on the surface of synthetic resin sheet with the printing layer, wherein the hard coating layer is formed in such a manner that a part of the hard coating layer method further comprises the steps of:

putting the synthetic resin sheet in a mold; and injecting molten transparent synthetic resin into the mold, by which a formed product of transparent synthetic resin forming a body of housing case together with the formed synthetic resin sheet is formed.

4. A housing case as claimed in claim 1 or 2, wherein said synthetic resin sheet is provided with push-button areas, and a formed product of transparent synthetic resin forming a body of housing case together with the formed synthetic synthetic resin sheet and movable button pieces formed integrally with the formed product of transparent synthetic resin are provided on the backside of the formed synthetic resin sheet.

5. A housing case as claimed in claim 4, wherein hard coating layer is applied on the surface of synthetic resin sheet with the printing layer, wherein the hard coating layer is formed in such a manner that a part of the hard coating layer method further comprises the steps of:

putting the synthetic resin sheet in a mold; and injecting molten transparent synthetic resin into the mold, by which a formed product of transparent synthetic resin forming a body of housing case together with the formed synthetic resin sheet is formed.

6. A housing case as claimed in claim 4, wherein slits is formed along contours of the push-button areas.

7. A housing case as claimed in claim 1, wherein hard coating layer is applied on the surface of synthetic resin sheet with the printing layer, wherein the hard coating layer is formed in such a manner that a part of the hard coating layer corresponding to the edge portions of housing case has low hardness and a part of the hard coating layer corresponding to the front of housing case has high hardness.

8. A housing case for apparatuses having both a display window and opaque ornamental layer on the surface of housing case, characterized in that the housing case comprises a a formed product of transparent synthetic resin forming a body of housing case, said formed product of transparent synthetic resin is provided with opaque printing layer in a pattern having unprinted portion corresponding to the display window and with hard coating layer covering the printing layer, wherein the hard coating layer is formed in such a manner that a part of the hard coating layer covering areas corresponding to the edge portions of the formed product of transparent synthetic resin has low hardness and a part of the hard coating layer covering an area corresponding to the front of the formed product of transparent synthetic resin has high hardness.

9. A housing case as claimed in claim 8, wherein the hard coating layer is formed in such a manner that a part of the hard coating layer corresponding to the edge portions of housing case is formed of low-hardness hard coating layer and a part of the hard coating layer corresponding to the front of housing case is formed of a laminate of low-hardness hard coating layer and high-hardness hard coating layer has high hardness.

10. A housing case as claimed in claim 8, wherein a part corresponding to the edge portions of housing case is a thin hard coating layer, and a part corresponding to the front of housing case is a thick hard coating layers.

11. A housing case as claimed in claim 7, wherein the hard coating layer is formed in such a manner that a part of the hard coating layer corresponding to the edge portions of housing case is formed of low-hardness hard coating layer and a part of the hard coating layer corresponding to the front of housing case is formed of a laminate of low-hardness hard coating layer and high-hardness hard coating layer has high hardness.

12. A housing case as claimed in claim 7, wherein a part corresponding to the edge portions of housing case is a thin hard coating layer, and a part corresponding to the front of housing case is a thick hard coating layers.

* * * * *